US012798968B2

(12) United States Patent
Nakaya et al.

(10) Patent No.: US 12,798,968 B2
(45) Date of Patent: Nov. 17, 2026

(54) METHOD FOR PRODUCING SOLID ELECTROLYTE

(71) Applicant: IDEMITSU KOSAN CO., LTD., Tokyo (JP)

(72) Inventors: Nobuhito Nakaya, Ichihara (JP); Hiroaki Yamada, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 563 days.

(21) Appl. No.: 18/272,843

(22) PCT Filed: Jan. 21, 2022

(86) PCT No.: PCT/JP2022/002274
§ 371 (c)(1),
(2) Date: Jul. 18, 2023

(87) PCT Pub. No.: WO2022/163541
PCT Pub. Date: Aug. 4, 2022

(65) Prior Publication Data

US 2024/0083748 A1 Mar. 14, 2024

(30) Foreign Application Priority Data

Jan. 28, 2021 (JP) ................................ 2021-011904

(51) Int. Cl.
*C01B 17/22* (2006.01)
*H01M 10/0562* (2010.01)

(52) U.S. Cl.
CPC ......... *C01B 17/22* (2013.01); *H01M 10/0562* (2013.01); *C01P 2002/02* (2013.01); *H01M 2300/008* (2013.01)

(58) Field of Classification Search
None
See application file for complete search history.

(56) References Cited

U.S. PATENT DOCUMENTS

2010/0261304 A1* 10/2010 Chang .................... H10F 71/00 257/E51.026
2012/0301796 A1 11/2012 Ohtomo et al.
(Continued)

FOREIGN PATENT DOCUMENTS

CN 111952560 A * 11/2020 ............ C01G 45/22
JP 2011129312 A 6/2011
(Continued)

OTHER PUBLICATIONS

JP-2019197713-A, English translation (Year: 2019).*
(Continued)

*Primary Examiner* — Stefanie J Cohen
(74) *Attorney, Agent, or Firm* — Element IP, PLC

(57) ABSTRACT

An object of the present invention is to provide a method of producing a modified sulfide solid electrolyte in which ionic conductivity reduction is suppressed, and a generation amount of a hydrogen sulfide gas is reduced even if a sulfide solid electrolyte comes in contact with moisture and hydrogen sulfide is generated, and the modified sulfide solid electrolyte, and an electrode combined material and a lithium ion battery using the same. The modified sulfide solid electrolyte producing method according to the present invention includes mixing the sulfide solid electrolyte with $Li_2S$, in which (100-α) parts by mass of the sulfide solid electrolyte is used per a parts by mass of $Li_2S$ (a represents a number of 0.3 to 15.0).

13 Claims, 8 Drawing Sheets

(56) References Cited

U.S. PATENT DOCUMENTS

| | | | | |
|---|---|---|---|---|
| 2016/0036504 A1* | 2/2016 | Khojastepour | ........ | H04B 7/024 370/280 |
| 2017/0352916 A1 | 12/2017 | Miyashita et al. | | |

FOREIGN PATENT DOCUMENTS

| | | | | |
|---|---|---|---|---|
| JP | 2011165650 A | | 8/2011 |
| JP | 2014209430 A | | 11/2014 |
| JP | 2017120728 A | | 7/2017 |
| JP | 2019160510 A | | 9/2019 |
| JP | 2019197713 A | * | 11/2019 |
| JP | 2020087633 A | | 6/2020 |
| WO | WO-2016104702 A1 | | 6/2016 |

OTHER PUBLICATIONS

CN-111952560-A, English translation (Year: 2020).*
International Search Report issued Apr. 5, 2022 in PCT/JP2022/002274 (with English translation), 5 pages.
Written Opinion issued Apr. 5, 2022 in PCT/JP2022/002274 (with English translation), 6 pages.

* cited by examiner

METHOD FOR PRODUCING SOLID ELECTROLYTE

TECHNICAL FIELD

The present invention relates to a method for producing a solid electrolyte, a modified sulfide solid electrolyte, and an electrode combined material and a lithium ion battery using it.

BACKGROUND ART

In recent years, with the rapid spread of information-related equipment or communication equipment such as PCs, video cameras, and mobile phones, an importance is given to the development of batteries used as a power source therefor. In batteries used in such applications, an electrolyte liquid containing a flammable organic solvent has been conventionally used. Meanwhile, when a battery is placed in the all solid state, a flammable organic solvent is not used within the battery, simplification of a safe device can be achieved, thereby improving a manufacturing cost and productivity. Thus, batteries in which an electrolyte liquid is replaced with a solid electrolyte layer are being developed.

As the solid electrolyte layer, the use of a sulfide solid electrolyte using lithium sulfide ($Li_2S$) or the like as a starting material has been examined. This sulfide solid electrolyte has a high lithium ionic conductivity (hereinafter, also simply referred to as ionic conductivity), but easily reacts with water (hereinafter, also including moisture) or oxygen, and generates a hydrogen sulfide ($H_2S$) gas especially by coming in contact with water. Thus, it is required to reduce a generation amount of the $H_2S$ gas.

A method of completely eliminating $Li_2S$, that is used as a raw material and remains after production of a sulfide solid electrolyte, is disclosed in order to reduce generation of $H_2S$ gas (PTL 1).

Further, a method of adding another compound has also been examined. For example, disclosed is a method of neutralizing generated $H_2S$ with an alkaline compound, and suppressing diffusion out of the system, that is, an invention, in which a part of $Li_2S$ of a sulfide solid electrolyte is replaced with $K_2S$ which is an alkaline compound (PTL 2).

Further, an invention is disclosed in which the surfaces of solid electrolyte particles are covered with an alkaline compound so as to suppress generation of $H_2S$ gas (PTLs 3 and 4).

CITATION LIST

Patent Literature

PTL 1: JP 2011-129312 A
PTL 2: JP 2019-160510 A
PTL 3: JP 2017-120728 A
PTL 4: JP 2011-165650 A

SUMMARY OF INVENTION

Technical Problem

An object of the present invention is to provide a modified sulfide solid electrolyte, in which ionic conductivity reduction is suppressed, and a cumulative generation amount of $H_2S$ gas is reduced over the medium- and long-term or the entire period even if the sulfide solid electrolyte comes in contact with moisture and $H_2S$ is generated, and a method of producing the modified sulfide solid electrolyte. It is to provide an electrode combined material and a lithium ion battery which use the modified sulfide solid electrolyte.

Solution to Problem

Provided are a production method of a modified sulfide solid electrolyte, the modified sulfide solid electrolyte, and an electrode combined material and a lithium ion battery which use the modified sulfide solid electrolyte.

The production method of the modified sulfide solid electrolyte according to the present invention includes mixing a sulfide solid electrolyte with $Li_2S$, in which (100-$\alpha$) parts by mass of the sulfide solid electrolyte is used (a represents a number of 0.3 to 15.0) per a parts by mass of $Li_2S$.

The modified sulfide solid electrolyte according to the present invention contains $Li_2S$ and the sulfide solid electrolyte $[(1-X-Y)(0.75Li_2S/0.25P_2S_5)/XLiBr/YLi]$ (in the formula, X represents a number of 0 to 0.2, and Y represents a number of 0 to 0.2), in which $Li_2S$ is a parts by mass (a represents a number of 0.3 to 15.0) with respect to (100-$\alpha$) parts by mass of the sulfide solid electrolyte.

Advantageous Effects of Invention

According to the present invention, it is possible to provide a modified sulfide solid electrolyte, in which ionic conductivity reduction is suppressed, and a cumulative generation amount of $H_2S$ gas is reduced over the medium- and long-term or the entire period even if the sulfide solid electrolyte comes in contact with moisture and $H_2S$ is generated, a production method of the modified sulfide solid electrolyte, and an electrode combined material and a lithium ion battery which use the modified sulfide solid electrolyte.

DESCRIPTION OF EMBODIMENTS

Figure 1:
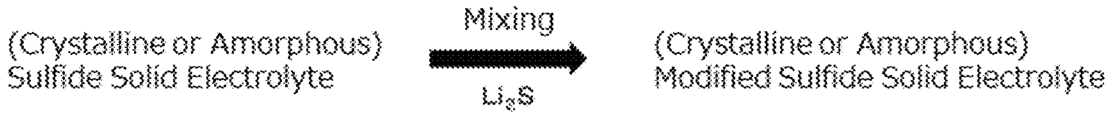
FIG. 1 is a flow diagram illustrating a preferable mode of a production method of the present embodiment.

Hereinafter, an embodiment of the present invention (hereinafter, referred to as "the present embodiment" in some cases) will be described. In the present specification, regarding the numerical value ranges of "or more", "or less", and "to", numerical values of an upper limit and a lower limit are numerical values which can be arbitrarily combined, and further, numerical values in Examples can also be used as the numerical values of the upper limit and the lower limit.

(Findings Obtained by the Present Inventors Until the Present Invention is Achieved)

The present inventors have conducted intensive studies in order to solve the above problems, and as a result, they have found the following matters, and have completed the present invention.

The production method described in PTL 1 requires a first glass process in which $Li_2S$ is completely consumed, and a second glass process in which $Li_2O$ is added as a bond-breaking compound so as to eliminate bridging sulfur. Thus, the manufacturing process tended to be complicated, and the manufacturing time tended to be long. Further, due to addition or the like of lithium oxide ($Li_2O$), the ionic conductivity of the produced sulfide solid electrolyte was not sufficiently high, and furthermore, there was a need to improve suppression of $H_2S$ gas generation. In particular, it was necessary to improve suppression in a process of manufacturing lithium batteries from the sulfide solid electrolyte, or a medium- and long-term or the entire period to be described later, during which the lithium batteries are used.

In the production method described in PTL 2, since potassium sulfide ($K_2S$) is present in the sulfide solid electrolyte, the ionic conductivity is not sufficiently high. Further, since $K_2S$ is dispersed in the sulfide solid electrolyte, the amount of $K_2S$ that contributes to neutralization of generated $H_2S$ is not sufficient. Thus, it was also necessary to improve suppression of $H_2S$ gas generation over the medium- and long-term to the entire period.

In the production methods described in PTLs 3 and 4, since the sulfide solid electrolyte is covered with the alkaline compound, a certain effect is exhibited in suppressing $H_2S$ generation. However, since the sulfide solid electrolyte was covered with something other than its raw materials, the ionic conductivity was lowered.

The present inventors have found that it is possible to provide a sulfide solid electrolyte, in which ionic conductivity reduction is suppressed, and a generation amount of $H_2S$ gas is reduced even if the sulfide solid electrolyte comes in contact with moisture and $H_2S$ is generated, and a method of producing the sulfide solid electrolyte, through a modified sulfide solid electrolyte producing method including mixing the sulfide solid electrolyte with $Li_2S$.

In the present embodiment, it has been found that although compounds other than raw materials of the sulfide solid electrolyte to be described later are not used, and a conventional manufacturing process is not significantly changed, by mixing the sulfide solid electrolyte with $Li_2S$, it is possible to produce the modified sulfide solid electrolyte in which ionic conductivity reduction is suppressed, and a $H_2S$ gas generation amount is reduced even if the sulfide solid electrolyte comes in contact with moisture and $H_2S$ is generated.

It is possible to modify the properties of the sulfide solid electrolyte by mixing the sulfide solid electrolyte with $Li_2S$ to be described later. In the modified sulfide solid electrolyte that can be produced by modification, the ionic conductivity reduction is suppressed, and the cumulative generation amount of $H_2S$ gas can be reduced over the medium- and long-term to the entire period even if the modified sulfide solid electrolyte comes in contact with moisture and $H_2S$ is generated. Thus, the present embodiment is an extremely excellent production method.

Further, in the modified sulfide solid electrolyte, the ionic conductivity reduction is suppressed, and the cumulative generation amount of $H_2S$ gas can be reduced over the medium- and long-term or the entire period.

In a conventional sulfide solid electrolyte production method, as in the inventions described in PTLs 1 to 4, in general, the ionic conductivity of the solid electrolyte was low, or the manufacturing process was complicated and the suppression of $H_2S$ gas generation was not sufficient. On the other hand, in the present embodiment, by performing "modification", both the high ionic conductivity and suppression of a cumulative generation amount of $H_2S$ over the medium- and long-term to the entire period were achieved.

In the present embodiment, attention is paid to $Li_2S$ which is a raw material of the sulfide solid electrolyte. The sulfide solid electrolyte and $Li_2S$ are mixed to "modify" the sulfide solid electrolyte. This is different from a conventional production method in that the "modified sulfide solid electrolyte" is obtained.

The reason why these are possible is not clear. However, as described in PTL 1, it has been conventionally thought that when $Li_2S$ remains, the $Li_2S$ decomposes to generate $H_2S$ gas. However, it is possible to consider a hypothesis in which when the content of $Li_2S$ on the surface of the sulfide solid electrolyte is increased, $H_2S$ gas generation accompanying $Li_2S$ decomposition is seen at the initial stage, but it is possible to suppress the $H_2S$ gas generation by efficiently grasping $H_2S$ generated over the medium- and long-term to the entire period.

In the present specification, the "initial stage" means 0 min to 60 min in the $H_2S$ gas generation amount measurement method described in Examples, the "medium- and long-term" means 60 min to 240 min in the same, and the "entire period" means 0 min to 360 min in the same.

The generation of $H_2S$ gas at the initial stage is based on the assumption that $H_2S$ gas is generated during a manufacturing process of the modified sulfide solid electrolyte and a manufacturing process of a lithium ion battery or the like.

The generation of $H_2S$ gas in the medium- and long-term corresponds to a period during which processes of storage and transportation of the manufactured modified sulfide solid electrolyte, and manufacturing of the lithium ion battery or the like are performed. In the medium- and long-term, it is important to prolong the time until the generation of $H_2S$ gas sharply increases again after increasing once at the initial stage and then decreasing. Hereinafter, in the present specification, the time until the generation amount of $H_2S$ gas increases again is referred to as a "breakthrough time". If the breakthrough time is long, the generation amount of $H_2S$ gas in the medium- and long-term is suppressed. A long breakthrough time suppresses $H_2S$ gas generation in processes such as storage and transportation of the modified sulfide solid electrolyte or manufacturing of the lithium ion battery, and thus is preferable because a device of absorbing the $H_2S$ gas is unnecessary or can be simplified. The breakthrough time can be determined by, for example, the method described in Examples.

Although the details will be described later, in the measurement method described in Examples, the breakthrough time was defined as a flow time when the $H_2S$ gas generation was 5 mL/g larger than the average value of cumulative generation amounts for 60 min and 120 min as the flow time. This 5 mL/g was determined in consideration of the influence of $H_2S$ gas generation on the storage or transportation environment.

The $H_2S$ gas generation amount over the entire period includes the initial stage and the medium- and long-term, and is based on the assumption that $H_2S$ gas is cumulatively generated over the entire period of subsequent use of a lithium ion battery or the like using a modified sulfide solid electrolyte.

In the past, attention was paid to only the initial stage. Thus, as in PTL 1, in order to reduce generation of $H_2S$ gas, the reduction of the content of $Li_2S$ containing sulfur atoms which constitute $H_2S$ has been examined. This is natural because $Li_2S$ generates $H_2S$ by reacting with water.

In the present invention, with a focus on the $H_2S$ gas generation in the medium- and long-term and the entire period, conversely, the increase of the content of $Li_2S$ has led to success in suppressing a cumulative generation amount of $H_2S$ gas during a target period, in the medium- and long-term and the entire period. This is a surprising effect in view of conventional common general technical knowledge.

In the present invention, the content of $Li_2S$ of the entire sulfide solid electrolyte is not increased, and the content of $Li_2S$ on the surface of the sulfide solid electrolyte is increased. Thus, since the content of $Li_2S$ of the entire sulfide solid electrolyte is suppressed, although $H_2S$ gas is generated at the initial stage, suppression is possible within an allowable range. That is, in the present invention, after the $H_2S$ gas generation at the initial stage, the generation of $H_2S$ gas can be suppressed for a long time. By including $Li_2S$ on the surface, it is possible to prolong the time during which this $H_2S$ gas is not generated (the breakthrough time). Furthermore, the generation amount of $H_2S$ gas can be suppressed even during the entire period, and only the content of $Li_2S$ which is a raw material of the sulfide solid electrolyte is increased. Thus, it is thought that the ionic conductivity can also be made high.

Hereinafter, descriptions will be made on a method of producing a modified sulfide solid electrolyte according to the first to tenth aspects of the present embodiment.

A method of producing a modified sulfide solid electrolyte according to a first aspect of the present embodiment is a modified sulfide solid electrolyte producing method including mixing a sulfide solid electrolyte with $Li_2S$, in which (100-$\alpha$) parts by mass of the sulfide solid electrolyte is used per a parts by mass of $Li_2S$ ($\alpha$ represents a number of 0.3 to 15.0).

In PTL 3, a sulfide solid electrolyte is covered with $Li_2O$ or lithium carbonate ($Li_2CO_3$). On the other hand, in the first embodiment, $Li_2S$, which is a raw material of the sulfide solid electrolyte, is mixed with the sulfide solid electrolyte. In this manner, the modified sulfide solid electrolyte produced in the first embodiment can be modified with $Li_2S$ which is a raw material. Further, since its content is set within a specific range, the effect given to the composition of the sulfide solid electrolyte itself is extremely small. Thus, the ionic conductivity can be kept high.

As described in PTL 1, it has been conventionally thought that it is preferable that $Li_2S$ is not contained in the sulfide solid electrolyte because it generates $H_2S$ gas by decomposition. On the other hand, in the present first aspect, a layer having a high $Li_2S$ content is formed near the surface of the modified sulfide solid electrolyte. Thus, although $H_2S$ is generated by decomposition of $Li_2S$ present on the surface at the initial stage, the generation amount can be suppressed to an allowable amount. Further, since $H_2S$ is efficiently absorbed rather than being present in the layer during the entire period, the $H_2S$ gas generation can be suppressed.

Although a mechanism by which the generation of $H_2S$ gas can be suppressed is not clear, when $Li_2S$ is present on the surface of the sulfide solid electrolyte, its reaction with moisture in the atmosphere causes $H_2S$ generation but an alkaline lithium compound is also generated at the same time. It is thought that $H_2S$ generated at this time corresponds to the $H_2S$ gas generation at the initial stage. However, the generated alkaline lithium compound is deliquesced by moisture in the atmosphere, and substantially covers the surface of the sulfide solid electrolyte. Then, a mechanism is presumed in which even if $H_2S$ is generated from the inside of the sulfide solid electrolyte, neutralization occurs, and the release of $H_2S$ as a gas to the outside of the system is suppressed.

In the first aspect, since the sulfide solid electrolyte is mixed with $Li_2S$, the use amount of $Li_2S$ can be easily changed. By using (100-$\alpha$) parts by mass of the sulfide solid electrolyte per a parts by mass of $Li_2S$ ($\alpha$ represents a number of 0.3 to 15.0), it is possible to extend the breakthrough time while suppressing the generation amount of $H_2S$ gas at the initial stage. Then, it is possible to suppress the generation of $H_2S$ gas during the entire period. In PTL 2, $K_2S$ is contained in the solid electrolyte, and $H_2S$ generation is suppressed by $K_2S$ dispersed in the solid electrolyte. Whereas, in the first aspect, by increasing the content of $Li_2S$ on the surface of the sulfide solid electrolyte as described above, it is possible to efficiently suppress $H_2S$ gas generation without increasing the amount of $Li_2S$ in the entire solid electrolyte. By limiting the use amount of $Li_2S$ in this way, it is possible to optimize the balance between $H_2S$ gas generation at the initial stage, extension of the breakthrough time, and $H_2S$ gas generation during the entire period.

The modified sulfide solid electrolyte producing method according to a second aspect of the present embodiment is a modified sulfide solid electrolyte producing method, in which the sulfide solid electrolyte contains a lithium atom, a sulfur atom, and a phosphorus atom.

As in the present second aspect, it is desirable that the sulfide solid electrolyte contains a lithium atom, a sulfur atom, and a phosphorus atom because the ionic conductivity of the modified sulfide solid electrolyte is increased.

The modified sulfide solid electrolyte producing method according to a third aspect of the present embodiment is a modified sulfide solid electrolyte producing method, in which the sulfide solid electrolyte further contains a halogen atom.

It is desirable that, as described below, the sulfide solid electrolyte further contains a halogen atom, because the ionic conductivity of the modified sulfide solid electrolyte can be improved.

The modified sulfide solid electrolyte producing method according to a fourth aspect of the present embodiment is a modified sulfide solid electrolyte producing method, in which the sulfide solid electrolyte is a solid electrolyte represented by $[(1\text{-}X\text{-}Y)(0.75Li_2S/0.25P_2S_5)/XLiBr/YLi]$ (in which X represents a number of 0 to 0.2, Y represents a number of 0 to 0.2, $P_2S_5$ represents diphosphorus pentasulfide, LiBr represents lithium bromide, and LiI represents lithium iodide).

As described below, it is desirable that the sulfide solid electrolyte has a specific composition because the ionic conductivity of the modified sulfide solid electrolyte can be improved.

The modified sulfide solid electrolyte producing method according to a fifth aspect of the present embodiment is a modified sulfide solid electrolyte producing method, in which the mixing is performed by using a pulverizer.

It is desirable that the mixing is performed by using a pulverizer because it is possible to utilize solid electrolyte production equipment that has been conventionally used, and to produce a homogeneous modified sulfide solid electrolyte.

The modified sulfide solid electrolyte producing method according to a sixth aspect of the present embodiment is a modified sulfide solid electrolyte producing method, in which the sulfide solid electrolyte is an amorphous sulfide solid electrolyte or a crystalline sulfide solid electrolyte.

This is preferable because ionic conductivity reduction can be suppressed.

The modified sulfide solid electrolyte producing method according to a seventh aspect of the present embodiment is a modified sulfide solid electrolyte producing method further including:

obtaining the sulfide solid electrolyte by mixing a raw material component including at least one selected from a lithium atom, a sulfur atom, and a phosphorus atom, with a complexing agent.

It is desirable to use a raw material component including at least one selected from a lithium atom, a sulfur atom, and a phosphorus atom because a modified sulfide solid electrolyte with a high ionic conductivity can be obtained. Further, as described below, it is desirable to use a complexing agent because it is possible to reduce the amount of energy to be input during production. Furthermore, it is preferable to use a complexing agent because a homogeneous modified sulfide solid electrolyte can be obtained.

The modified sulfide solid electrolyte producing method according to an eighth aspect of the present embodiment is a modified sulfide solid electrolyte producing method, in which the modified sulfide solid electrolyte includes a thio-LISICON Region II type crystal structure.

The production method of the present invention is particularly suitable in producing a crystalline sulfide solid electrolyte including a thio-LISICON Region II type crystal structure, and is preferable from the viewpoint of improving ionic conductivity.

A method of producing a crystalline modified sulfide solid electrolyte according to a ninth aspect of the present embodiment is a crystalline modified sulfide solid electrolyte producing method including further crystallizing the modified sulfide solid electrolyte.

Further crystallizing the modified sulfide solid electrolyte is preferable because the ionic conductivity is improved.

A modified sulfide solid electrolyte according to a tenth aspect of the present embodiment is a modified sulfide solid electrolyte containing $Li_2S$ and a sulfide solid electrolyte $[(1\text{-}X\text{-}Y)(0.75Li_2S/0.25P_2S_5)/XLiBr/YLiI]$ (in which X represents a number of 0 to 0.2, and Y represents a number of 0 to 0.2), in which $Li_2S$ is a parts by mass (a represents a number of 0.3 to 15.0) with respect to (100-α) parts by mass of the sulfide solid electrolyte.

It is desirable that the modified sulfide solid electrolyte has the composition, because ionic conductivity reduction is suppressed, and the generation amount of $H_2S$ gas can be reduced even if the sulfide solid electrolyte comes in contact with moisture and $H_2S$ is generated.

The modified sulfide solid electrolyte according to an eleventh aspect of the present embodiment is a modified sulfide solid electrolyte, in which a 1% by mass aqueous solution of the modified sulfide solid electrolyte has a pH value of 9.0 or more.

The pH value is a value that reflects the amount of $Li_2S$ contained in the modified sulfide solid electrolyte. It is desirable that the modified sulfide solid electrolyte has the pH value, because ionic conductivity reduction is suppressed, and the generation amount of $H_2S$ gas can be reduced even if the sulfide solid electrolyte comes in contact with moisture and $H_2S$ is generated.

The pH value can be determined by, for example, the method described in Examples.

An electrode combined material according to a twelfth aspect of the present embodiment is an electrode combined material including the modified sulfide solid electrolyte, and an electrode active material.

In the electrode combined material including the modified sulfide solid electrolyte, a high ionic conductivity is exhibited, and a cumulative generation amount of $H_2S$ gas is reduced over a medium- and long-term or an entire period in the case of a contact with moisture.

A lithium ion battery according to a thirteenth aspect of the present embodiment is a lithium ion battery including at least one of the modified sulfide solid electrolyte and the electrode combined material.

In the modified sulfide solid electrolyte and/or the electrode combined material including the modified sulfide solid electrolyte, a high ionic conductivity is exhibited, and a cumulative generation amount of $H_2S$ gas is reduced over a medium- and long-term or an entire period in the case of a contact with moisture.

Further, the electrode combined material exhibits excellent battery characteristics over a long period of time, and it is expected that a lithium ion battery using this will exhibit excellent battery characteristics over a long period of time.

Hereinafter, a production method and a modified solid electrolyte of the present embodiment will be described in more detail in accordance with the embodiments.

[Method of Producing Modified Sulfide Solid Electrolyte]

As illustrated in FIG. 1, the production method of the modified sulfide solid electrolyte of the present embodiment includes mixing a sulfide solid electrolyte with $Li_2S$, in which it is necessary to use (100-α) parts by mass of the sulfide solid electrolyte per a parts by mass of $Li_2S$ (α represents a number of 0.3 to 15.0).

Figure 2:
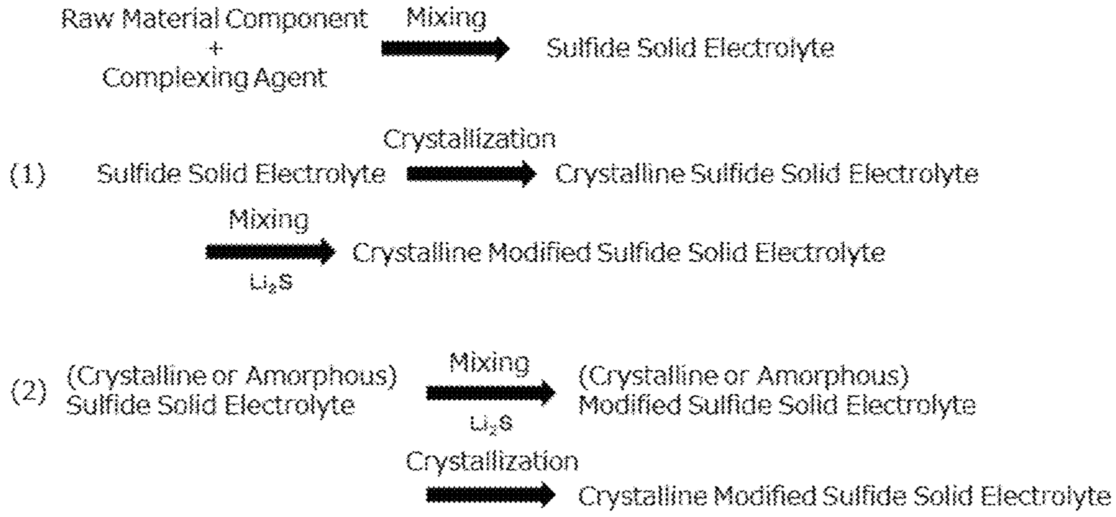
FIG. 2 is flow diagrams illustrating preferable modes of the production method of the present embodiment.

It is desirable that the production method of the modified sulfide solid electrolyte of the present embodiment further includes crystallizing the modified sulfide solid electrolyte as described below. When the crystallization is further included, depending on the order of mixing and crystallization, as illustrated in FIG. 2, methods (1) and (2) may be preferably exemplified. (1) in FIG. 2 is a production method in which a sulfide solid electrolyte is crystallized to obtain a crystalline sulfide solid electrolyte, and then this is mixed with $Li_2S$ to obtain a crystalline modified sulfide solid electrolyte. (2) in FIG. 2 is a production method in which a sulfide solid electrolyte is mixed with $Li_2S$ to obtain a (crystalline or amorphous) modified sulfide solid electrolyte, and then this is crystallized to obtain a crystalline sulfide solid electrolyte.

<Mixing>

There is no particular limitation on the mixing of the sulfide solid electrolyte and $Li_2S$ (also described as modification in the present specification). The mixing may be performed by using a pulverizer, may be performed by using an agitator, or may be performed by using a mixer, but it is desirable to use the pulverizer because it is possible to produce a homogeneous modified sulfide solid electrolyte in which the reduction of ionic conductivity is suppressed, and the generation amount of $H_2S$ gas is reduced.

(Mixing Using Pulverizer)

The mixing using a pulverizer is a method that has been conventionally adopted as a mechanical milling method. As for the pulverizer, for example, a medium-type pulverizer using a pulverization medium can be used.

Medium-type pulverizers are roughly divided into container-driven pulverizers, and medium agitation-type pulverizers. Examples of the container-driven pulverizer include an agitating tank, a pulverizing tank, and a combination of these, such as a ball mill and a bead mill. Further, examples of the medium agitation-type pulverizer include: impact-type pulverizers such as a cutter mill, a hammer mill, and a pin mill; tower-type pulverizers such as a tower mill; agitating tank-type pulverizers such as an attritor, an aquamizer, and a sand grinder; flow tank-type pulverizers such as a visco mill and a pearl mill; flow pipe-type pulverizers; annular pulverizers such as a coball mill; continuous dynamic pulverizers; and various pulverizers such as single-screw or multi-screw kneaders. Among them, in terms of the ease of particle size adjustment of obtained sulfide, the ball mill or the bead mill exemplified as the container-driven pulverizer is preferable.

These pulverizers can be appropriately selected according to a desired scale, etc. For a relatively small scale, container-driven pulverizers such as a ball mill and a bead mill can be used, and in a case of a large scale or mass production, other types of pulverizers may be used.

The size of beads and balls used in the ball mill and the bead mill may be appropriately selected according to a desired particle size, a throughput, etc. For example, the diameter of beads is usually 0.05 mmφ or more, preferably 0.1 mmφ or more, more preferably 0.2 mmφ or more, and the upper limit is usually 5.0 mmφ or less, preferably 3.0 mmφ or less, more preferably 2.0 mmφ or less. Further, the diameter of balls is usually 2.0 mmφ or more, preferably 2.5 mmφ or more, more preferably 3.0 mmφ or more, and the upper limit is usually 30.0 mmφ or less, preferably 20.0 mmφ or less, more preferably 15.0 mmφ or less.

The use amount of the beads or balls varies depending on the scale of the processing, and thus cannot be generalized. However, it is usually 100 g or more, preferably 200 g or more, more preferably 300 g or more, and the upper limit is 5.0 kg or less, more preferably 3.0 kg or less, further preferably 1.0 kg or less.

Further, examples of the material include: metals such as stainless steel, chrome steel, and tungsten carbide; ceramics such as zirconia, and silicon nitride; and minerals such as agate.

Regarding the peripheral speed of the rotating body, the low peripheral speed and the high peripheral speed may vary depending on, for example, a particle size, a material, and an use amount of the medium used for the pulverizer and thus cannot be generally defined. For example, in the case of a device not using a pulverization medium of balls or beads, such as a high-speed swirling thin film-type agitator, crushing mainly occurs even at a relatively high peripheral speed and granulation hardly occurs. Meanwhile, in the case of a device using a pulverization medium such as a ball mill or a bead mill, as already mentioned, crushing can occur at a low peripheral speed, and granulation is possible at a high peripheral speed. Therefore, when predetermined conditions such as a pulverizing device and a pulverization medium are the same, the peripheral speed at which crushing is possible is lower than the peripheral speed at which granulation is possible. Therefore, for example, under the condition in which granulation becomes possible with a peripheral speed of 6 m/s as a boundary, a low peripheral speed means a speed of less than 6 m/s, and a high peripheral speed means a speed of 6 m/s or more.

The peripheral speed may be appropriately selected according to a modified sulfide solid electrolyte to be manufactured, which may be either a low peripheral speed or a high peripheral speed as long as a sulfide solid electrolyte can be covered with $Li_2S$ so as to obtain the sulfide solid electrolyte in which the ionic conductivity is high, and the generation amount of $H_2S$ gas is reduced.

Further, the modification time varies depending on the scale of the processing, and thus cannot be generalized. However, it is usually 10 min or more, preferably 20 min or more, more preferably 30 min or more, further preferably 45 min or more, and the upper limit is usually 72 h or less, preferably 65 h or less, more preferably 52 h or less. This range is preferable because as the modification progresses, generation of $H_2S$ is suppressed.

By selecting the size and material of the medium (beads, balls) to be used, the number of rotations of a rotor, the time, and the like, it is possible to perform mixing, agitation, pulverization, or a combination of these processes, and then it is possible to adjust the particle size, etc. of the sulfide to be obtained.

(Mixing Using Agitator or Mixer)

As an agitator or a mixer, for example, a mechanical agitation-type mixer capable of stirring with agitation blades provided within a reaction tank (this may also be referred to as mixing by agitation, or agitation mixing) may be exemplified. Examples of the mechanical agitation-type mixer include a high-speed agitation type mixer, and a double-arm type mixer. Further, as for the high-speed agitation type mixer, a vertical shaft rotary mixer, a horizontal shaft rotary mixer, etc. may be exemplified, and any mixer may be used.

As for the shape of the agitation blade used in the mechanical agitation-type mixer, a blade type, an arm type, an anchor type, a paddle type, a full zone type, a ribbon type, a multistage-blade type, a double arm type, a shovel type, a twin-shaft blade type, a flat blade type, a C-type blade type, etc. may be exemplified. From the viewpoint of more efficiently promoting the reaction of raw materials, a shovel type, a flat blade type, a C-type blade type, an anchor type, a paddle type, a full zone type, etc. are preferable, and an anchor type, a paddle type, and a full zone type are more preferable. In the case of the carrying out on a small scale, it is also desirable to use a Schlenk bottle using a stirring bar or a separable flask equipped with a rotary blade.

When the mechanical agitation-type mixer is used, the number of rotations of the agitation blade may be appropriately adjusted according to the volume and temperature of a fluid in the reaction tank, the shape of the agitation blade, etc., and is not particularly limited, but is usually about 5 rpm to 400 rpm. From the viewpoint of more efficiently promoting the reaction of raw materials, it is preferably 10 rpm to 300 rpm, more preferably 15 rpm to 250 rpm, further preferably 20 rpm to 230 rpm.

When mixing is performed by using a mixer, the temperature condition is not particularly limited, and is usually, for example, −30 to 120° C., preferably −10 to 100° C., more preferably 0 to 80° C., further preferably 10 to 60° C. It is also desirable to perform mixing without performing a temperature control from the outside. Further, the mixing time is usually 0.1 to 500 h, and is preferably 1 to 450 h, more preferably 10 to 425 h, further preferably 20 to 400 h, still more preferably 30 to 300 h from the viewpoint of making the raw material dispersion state more uniform, and promoting the reaction.

<$Li_2S$>

As for $Li_2S$ to be mixed with the sulfide solid electrolyte, the same as a raw material component to be described later can be used.

For the use amount, it is necessary to use (100-α) parts by mass of the sulfide solid electrolyte per α parts by mass of $Li_2S$.

α can prolong a breakthrough time, and thus, needs to be a number of 0.3 to 15.0. If it is the lower limit value or more, the generation amount of $H_2S$ gas can be suppressed over the entire period, and if it is the upper limit value or less, $H_2S$ gas generation at the initial stage can be suppressed. Then, the reduction of ionic conductivity of the modified sulfide solid electrolyte can be further suppressed. Thus, a number of 0.5 to 8.0 is more preferable, a number of 0.8 to 6.5 is more preferable, and a number of 1.0 to 6.0 is still further preferable.

<Sulfide Solid Electrolyte>

The sulfide solid electrolyte of the present embodiment is a solid electrolyte that contains at least a sulfur atom, and also has ionic conductivity caused by a conductive species exhibiting ionic conductivity such as an alkali metal, e.g., lithium, sodium, potassium, rubidium, cesium, and francium. Further, the conductive species is preferably a lithium atom from the viewpoint of improving ionic conductivity, and from the same viewpoint, it is preferable to contain a phosphorus atom, and a halogen atom.

In the present specification, a "solid electrolyte" means an electrolyte kept as a solid at 25° C. under a nitrogen atmosphere.

The "solid electrolyte" of the present specification includes both a crystalline solid electrolyte having a crystal structure, and an amorphous solid electrolyte. Thus, the sulfide solid electrolyte is preferably an amorphous sulfide solid electrolyte or a crystalline sulfide solid electrolyte.

In the present specification, the crystalline sulfide solid electrolyte is a solid electrolyte in which solid electrolyte-derived peaks are observed in the X-ray diffraction pattern in X-ray diffraction measurement. To these, the presence/absence of a peak derived from a raw material of the solid electrolyte is not related. That is, the crystalline sulfide solid electrolyte contains a crystal structure derived from the solid electrolyte, in which a part of the crystal structure may be derived from the solid electrolyte, or the crystal structure may be entirely derived from the solid electrolyte. Then, as long as the crystalline sulfide solid electrolyte has the X-ray diffraction pattern as mentioned above, a part thereof may contain an amorphous solid electrolyte. Therefore, the crystalline sulfide solid electrolyte contains so-called glass ceramics obtained by heating the amorphous solid electrolyte to a crystallization temperature or higher.

Further, in the present specification, the amorphous solid electrolyte has a halo pattern in which peaks other than material-derived peaks are not substantially observed in the X-ray diffraction pattern in the X-ray diffraction measurement. It does not matter whether there is a peak derived from a raw material of the solid electrolyte.

The sulfide solid electrolyte preferably contains a lithium atom, a sulfur atom, and a phosphorus atom from the viewpoint of increasing ionic conductivity, and also preferably contains a halogen atom because the ionic conductivity is further increased.

More specifically, it is desirable that the sulfide solid electrolyte is a solid electrolyte, represented by $[(1\text{-}X\text{-}Y)(0.75Li_2S/0.25P_2S_5)/XLiBr/YLi]$ (in the formula, X represents a number of 0 to 0.2, and Y represents a number of 0 to 0.2)

because the ionic conductivity is increased.

In the present embodiment, the generation of $H_2S$ gas can be suppressed by modification, but since the ionic conductivity of the modified sulfide solid electrolyte is greatly affected by the ionic conductivity of the used sulfide solid electrolyte, it is desirable that the sulfide solid electrolyte has a high ionic conductivity.

From the viewpoint of increasing the ionic conductivity of the sulfide solid electrolyte, X is preferably 0 to 0.15, more preferably 0 to 0.13, further preferably 0 to 0.12, and Y is preferably 0 to 0.15, more preferably 0 to 0.13, further preferably 0 to 0.12.

When the sulfide solid electrolyte contains both LiBr and LiI, X is preferably 0.01 to 0.15, more preferably 0.05 to 0.13, further preferably 0.08 to 0.12, and Y is preferably 0.01 to 0.15, more preferably 0.05 to 0.13, further preferably 0.08 to 0.12.

This is the same even after modification.

(Production Method of Sulfide Solid Electrolyte)

Methods for producing a sulfide solid electrolyte are broadly divided into a solid phase method and a liquid phase method. Further, the liquid phase method includes a homogeneous method in which materials of the solid electrolyte are completely dissolved in a solvent and a heterogeneous method in which materials of the solid electrolyte are not completely dissolved, and become a solid-liquid coexistent suspension. For example, as the solid phase method, a method is known in which raw materials such as $Li_2S$, and $P_2S_5$ are subjected to a mechanical milling treatment using a device such as a ball mill or a bead mill, and are subjected to a heat treatment as necessary, so as to produce an amorphous or crystalline solid electrolyte (see e.g., International Publication No. 2017/159667 pamphlet). According to this method, a mechanical stress is applied to the raw materials such as $Li_2S$ so that a reaction between solids is promoted and then the solid electrolyte is obtained.

Meanwhile, as the homogeneous method among liquid phase methods, a method in which a solid electrolyte is dissolved in a solvent and is reprecipitated is known (see e.g., JP 2014-191899 A), and as the heterogeneous method, a method in which solid electrolyte raw materials such as $Li_2S$ are reacted in a solvent including a polar aprotic solvent is known (see International Publication No. 2014/192309 pamphlet, International Publication No. 2018/054709 pamphlet, and "CHEMISTRY OF MATERIALS", 2017, No. 29, pp. 1830-1835). For example, a method of producing a solid electrolyte having a $Li_4PS_4$ structure by using dimethoxyethane (DME) is disclosed, which includes a step of obtaining $Li_3PS_4{\cdot}DME$ through a combination with a $Li_3PS_4$ structure.

In the present embodiment, the production method of the sulfide solid electrolyte may be either a solid phase method or a liquid phase method, but the liquid phase method is preferred because a large amount can be easily synthesized, and a homogeneous sulfide solid electrolyte can be produced.

In the solid phase method, it is preferable to obtain a sulfide solid electrolyte by mixing with a raw material component to be described later. As for the liquid phase method, preferred is a so-called heterogeneous method in which a raw material component to be described later and a complexing agent are mixed together with a solvent as necessary so as to obtain a sulfide solid electrolyte.

(Raw Material Component)

The raw material component used in the present embodiment preferably contains a conductive species exhibiting ionic conductivity such as lithium, and a sulfur atom, and further, it is desirable that a phosphorus atom is contained. Furthermore, it is also preferable that the raw material component used in the present embodiment contains a halogen atom as necessary, from the viewpoint of obtaining a sulfide solid electrolyte having a specific crystal system to be described later, thereby improving ionic conductivity.

More specifically, raw materials containing at least two atoms selected from the four atoms, for example, lithium sulfides; lithium halides such as lithium fluoride, lithium chloride, lithium bromide, and lithium iodide; phosphorus sulfides such as diphosphorus trisulfide ($P_2S_3$), and diphosphorus pentasulfide ($P_2S_5$); phosphorus halides such as various phosphorus fluorides ($PF_3$, $PF_5$), various phosphorus chlorides ($PCl_3$, $PCl_5$, $P_2Cl_4$), various phosphorus bromides ($PBr_3$, $PBr_5$), and various phosphorus iodides ($PI_3$, $P_2I_4$); and thiophosphoryl halides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$); and single halogen substances such as fluorine ($F_2$), chlorine ($Cl_2$), bromine ($Br_2$), and iodine ($I_2$), preferably bromine ($Br_2$), and iodine ($I_2$) may be representatively exemplified.

A material that can be used as a raw material other than the above is, for example, a raw material containing at least one atom selected from the four atoms and containing an atom other than the four atoms. More specific examples thereof include: lithium compounds such as lithium oxide, lithium hydroxide, and lithium carbonate; alkali metal sulfides such as sodium sulfide, potassium sulfide, rubidium sulfide, and cesium sulfide; metal sulfides such as silicon sulfide, germanium sulfide, boron sulfide, gallium sulfide, tin sulfide (SnS, $SnS_2$), aluminum sulfide, and zinc sulfide; phosphoric acid compounds such as sodium phosphate, and lithium phosphate; halides of alkali metals other than lithium such as sodium halides such as sodium iodide, sodium fluoride, sodium chloride, and sodium bromide; metal halides such as aluminum halide, silicon halide, germanium halide, arsenic halide, selenium halide, tin halide, antimony halide, tellurium halide, and bismuth halide; and phosphorus oxyhalides such as phosphorus oxychloride ($POCl_3$), and phosphorus oxybromide ($POBr_3$).

Among the above, preferred are phosphorus sulfides such as lithium sulfide, diphosphorus trisulfide ($P_2S_3$), and diphosphorus pentasulfide ($P_2S_5$), single halogen substances such as fluorine ($F_2$), chlorine ($Cl_2$), bromine ($Br_2$), and iodine ($I_2$), and lithium halides such as lithium fluoride, lithium chloride, lithium bromide, and lithium iodide. Further, when an oxygen atom is introduced into the solid electrolyte, preferred are phosphoric acid compounds such as lithium oxide, lithium hydroxide and lithium phosphate. Preferable examples of the combination of raw materials include a combination of lithium sulfide, diphosphorus pentasulfide and lithium halide, and a combination of lithium sulfide, diphosphorus pentasulfide and a single halogen substance. As for the lithium halide, lithium bromide, and lithium iodide are preferable, and as for the single halogen substance, bromine and iodine are preferable.

In the present embodiment, $Li_3PS_4$ including a $PS_4$ structure can also be used as a part of the raw materials. Specifically, first, $Li_3PS_4$ is prepared through production, and then this is used as a raw material.

The content of $Li_3PS_4$ relative to the total of raw materials is preferably 60 to 100 mol %, more preferably 65 to 90 mol %, further preferably 70 to 80 mol %.

Further, when $Li_3PS_4$ and the single halogen substance are used, the content of the single halogen substance relative to $Li_3PS_4$ is preferably 1 to 50 mol %, more preferably 10 to 40 mol %, further preferably 20 to 30 mol %, still more preferably 22 to 28 mol %.

The lithium sulfide used in the present embodiment is preferably a particle. The average particle size ($D_{50}$) of lithium sulfide particles is preferably 10 μm to 2000 μm, more preferably 30 μm to 1500 μm, further preferably 50 μm to 1000 μm. In the present specification, the average particle size ($D_{50}$) is a particle diameter at a point where 50% of the total is reached when a particle diameter distribution cumulative curve is drawn and a sequential cumulation is made from the particle having the smallest particle diameter, and the volume distribution refers to, for example, an average particle size that can be measured by using a laser diffraction/scattering particle diameter distribution measuring device. Further, among the above-exemplified raw materials, the solid raw material preferably has an average particle size on the same level as the lithium sulfide particles. That is, it preferably has an average particle size falling within the same range as that of the lithium sulfide particles.

When lithium sulfide, diphosphorus pentasulfide and lithium halide are used as for the raw materials, the ratio of lithium sulfide to the total of lithium sulfide and diphosphorus pentasulfide is preferably 70 to 80 mol %, more preferably 72 to 78 mol %, further preferably 74 to 78 mol % from the viewpoint of obtaining higher chemical stability and higher ionic conductivity.

When lithium sulfide, diphosphorus pentasulfide, lithium halide, and other raw materials to be used as necessary are used, the content of lithium sulfide and diphosphorus pentasulfide relative to the total of these is preferably 60 to 100 mol %, more preferably 65 to 90 mol %, further preferably 70 to 80 mol %.

Further, when a combination of lithium bromide and lithium iodide is used as lithium halide, from the viewpoint of improving ionic conductivity, the ratio of lithium bromide to the total of lithium bromide and lithium iodide is preferably 1 to 99 mol %, more preferably 20 to 90 mol %, further preferably 30 to 70 mol %, particularly preferably 40 to 60 mol %.

When lithium sulfide, diphosphorus pentasulfide, lithium bromide and lithium iodide are used, the ratio of lithium sulfide to the total of lithium sulfide, diphosphorus pentasulfide, lithium bromide and lithium iodide is preferably 30 to 90 mol %, more preferably 40 to 80 mol %, further preferably 50 to 70 mol %, still further preferably 55 to 65 mol %.

When a single halogen substance is used as the raw material and when lithium sulfide, and diphosphorus pentasulfide are used, relative to the total number of moles of lithium sulfide and diphosphorus pentasulfide excluding lithium sulfide having the same number of moles as the number of moles of the single halogen substance, the ratio of the number of moles of lithium sulfide excluding lithium sulfide having the same number of moles as the number of moles of the single halogen substance preferably falls within a range of 60 to 90%, more preferably falls within a range of 65 to 85%, further preferably falls within a range of 68 to 82%, still more preferably falls within a range of 72 to 78%, particularly preferably falls within a range of 73 to 77%. This is because at these ratios, higher ionic conductivity is obtained.

Further, from the viewpoint similar to this, when lithium sulfide, diphosphorus pentasulfide, and a single halogen substance are used, the content of the single halogen substance relative to the total amount of lithium sulfide, diphosphorus pentasulfide, and the single halogen substance is preferably 1 to 50 mol %, more preferably 2 to 40 mol %, further preferably 3 to 25 mol %, still more preferably 3 to 15 mol %.

When lithium sulfide, diphosphorus pentasulfide, a single halogen substance, and lithium halide are used, relative to the total amount of these, the content (@ mol %) of the single halogen substance, and the content (y mol %) of lithium halide preferably satisfy the following formula (2), more preferably satisfy the following formula (3), further preferably satisfy the following formula (4), still more preferably satisfy the following formula (5).

$$2 \leq 2\beta + y \leq 100 \quad (2)$$

$$4 \leq 2\beta + y \leq 80 \quad (3)$$

$$6 \leq 2\beta + y \leq 50 \quad (4)$$

$$6 \leq 2\beta + y \leq 30 \quad (5)$$

When two types of halogens are used as single substances, if the number of moles of one halogen atom in the substances is A1, and the number of moles of the other halogen atom in the substances is A2, A1:A2 is preferably 1 to 99:99 to 1, more preferably 10:90 to 90:10, further preferably 20:80 to 80:20, still more preferably 30:70 to 70:30.

Further, when the two types of single halogen substances are bromine and iodine, if the number of moles of bromine is B1, and the number of moles of iodine is B2, B1:B2 is preferably 1 to 99:99 to 1, more preferably 15:85 to 90:10, further preferably 20:80 to 80:20, still more preferably 30:70 to 75:25, particularly preferably 35:65 to 75:25.

When the complexing agent to be described later and the raw material component are mixed, it is preferable that the raw material component and the solvent to be described later are made into a slurry prior to the mixing because the raw material component becomes a uniform complexed product.

(Mixing of Raw Material Component)

Mixing in the solid phase method is preferably the same mixing as the mixing of $Li_2S$ and the sulfide solid electrolyte.

In mixing in the liquid phase method, the raw material component and the complexing agent to be described later preferably become an electrolyte precursor.

It is preferable that the raw material component is mixed with the complexing agent and the raw material component is complexed because in a liquid phase method or a heterogeneous method, a complex containing a lithium atom, a phosphorus atom, a sulfur atom and the like such as $Li_3PS_4$ is formed, and then a specific component is suppressed from being separated, and a homogeneous solid electrolyte can be obtained.

The mixing in the liquid phase method may be performed in the same manner as the mixing, but is preferably performed without using the pulverizer, and is preferably performed using an agitator or a mixer. Accordingly, it is possible to perform manufacturing with simple manufacturing equipment without using a large-size apparatus for pulverization. Thus, this is preferable from the viewpoint of simplification of a manufacturing process and reduction of input energy during the manufacturing.

Figure 3:
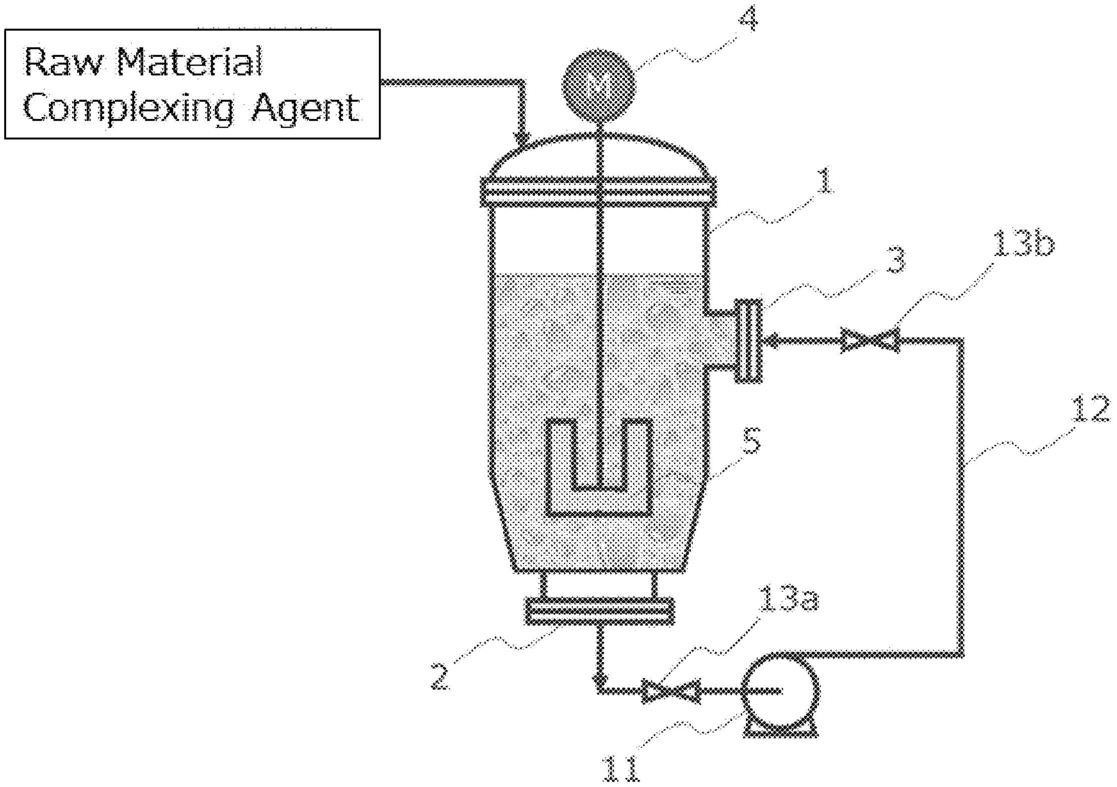
FIG. 3 is a flow diagram illustrating an example of a preferable mode of a flow including a reaction vessel used in production of an electrolyte precursor.

Further, the mixing in the liquid phase method may be mixing by circulating agitation in which a fluid in a reaction vessel is circulated as illustrated in FIG. 3 such that the fluid is extracted to the outside of the reaction vessel through an extraction port provided in the reaction vessel, and the extracted fluid is returned to the reaction vessel through a return port provided in the reaction vessel. The mixing by circulating agitation is preferable because the reaction of raw materials can be promoted without pulverization. Further, this is because even without strong agitation to the extent that the fluid splashes and adheres to the inner wall of the reaction vessel, a state of sedimentation and stagnation of a raw material having a high specific gravity, such as lithium halide, at the bottom of the reaction vessel, especially directly under a rotating shaft of an agitation blade, etc. is suppressed, and thus a sulfide solid electrolyte composition deviation caused by no contribution to the reaction is suppressed, and the reaction is efficiently promoted so that a sulfide solid electrolyte with a high ionic conductivity is obtained.

(Complexing Agent)

It is desirable that the sulfide solid electrolyte is obtained by mixing a raw material component containing at least one selected from a lithium atom, a sulfur atom, and a phosphorus atom, with a complexing agent.

The complexing agent is a substance capable of forming a complex with a lithium element. This means that it has a property of acting with a lithium element-containing sulfide or halide included in the raw material to promote the formation of an electrolyte precursor.

The complexing agent can be used with no particular limitation as long as it has the properties. In particular, preferred are compounds containing elements having a high affinity with a lithium element, for example, hetero elements such as a nitrogen element, an oxygen element, and a chlorine element. More preferably, compounds having groups containing these hetero elements may be exemplified. This is because these hetero elements, and groups containing the hetero elements can coordinate (bond) with lithium.

It is thought that the complexing agent has a property of easily forming an aggregate by binding to a lithium-containing raw material such as lithium halide, and a lithium-containing structure such as $Li_3PS_4$ typically including a $PS_4$ structure, which exists as a main structure in the solid electrolyte obtained by the present production method. This is because the molecule thereof has a hetero element having a high affinity with a lithium element. Therefore, when the raw material component is mixed with the complexing agent, the lithium-containing structure such as a $PS_4$ structure or its aggregate obtained by the complexing agent, and the lithium-containing raw material such as lithium halide or its aggregate obtained by the complexing agent exist evenly. Then, since an electrolyte precursor in which halogen elements are more dispersively fixed is obtained, as a result it is thought that a solid electrolyte in which ionic conductivity is high, and the $H_2S$ generation is suppressed is obtained. Further, it is thought that a predetermined average particle size and a specific surface area are easily obtained.

Therefore, it is preferable that at least two hetero elements that can be coordinated (bonded) are included in the molecule, and it is more preferable that a group including at least two hetero elements is included in the molecule. When the group including at least two hetero elements is included in the molecule, the lithium-containing structure such as $Li_3PS_4$ including a $PS_4$ structure and the lithium-containing raw material such as lithium halide can be combined via at least two hetero elements in the molecule. Then, since halogen elements are more dispersively fixed in the electrolyte precursor, as a result, a solid electrolyte having a predetermined average particle size and a specific surface area, in which the ionic conductivity is high, and the $H_2S$ generation is suppressed, is obtained. Further, among the hetero elements, a nitrogen element is preferable, and as a nitrogen element-containing group, an amino group is preferable. That is, as the complexing agent, an amine compound is preferable.

The amine compound is not particularly limited, because any compound having an amino group in its molecule can promote the formation of the electrolyte precursor, but a compound having at least two amino groups in its molecule is preferable. When this structure is included, the lithium-containing structure such as $Li_3PS_4$ including a $PS_4$ structure, and the lithium-containing raw material such as lithium halide, can be bonded via at least two nitrogen elements in the molecule. Then, since halogen elements are more dispersively fixed in the electrolyte precursor, as a result, a solid electrolyte having a high ionic conductivity as well as a predetermined average particle size and a specific surface area is obtained.

Examples of such an amine compound include amine compounds such as aliphatic amine, alicyclic amine, heterocyclic amine, and aromatic amine, and these may be used alone, or in combination of two or more types.

More specifically, as for the aliphatic amine, aliphatic diamines, e.g., aliphatic primary diamines such as ethylenediamine, diaminopropane, and diaminobutane; aliphatic secondary diamines such as N,N'-dimethylethylenecliamine, N,N'-diethylethylenediamine, N,N'-dimethyldiaminopropane, and N,N'-diethykliaminopropane; and aliphatic tertiary diamines such as N,N,N',N'-tetramethyldiaminomethane, N,N,N',N'-tetramethylethylenediamine, N,N,N',N'-tetraethylethylenediamine, N,N,N',N'-tetramethyldiaminoprop ane, N,N,N',N'-tetraethykliaminopropane, N,N,N',N'-tetramethyldiaminobutane, N,N,N',N'-tetramethyldiaminopentane, and N,N,N',N'-tetramethykliaminohexane; may be typically preferably exemplified. Here, in the examples in the present specification, for example, in the case of diaminobutane, unless otherwise specified, in addition to isomers related to the position of an amino group, such as 1,2-diaminobutane, 1,3-diaminobutane, and 1,4-diaminobutane, for butane, all isomers such as linear and branched isomers are included.

The number of carbon atoms of aliphatic amine is preferably 2 or more, more preferably 4 or more, further preferably 6 or more, and the upper limit is preferably 10 or less, more preferably 8 or less, further preferably 7 or less. Further, the number of carbon atoms in the hydrocarbon group of the aliphatic hydrocarbon group in the aliphatic amine is preferably 2 or more, and the upper limit is preferably 6 or less, more preferably 4 or less, further preferably 3 or less.

As for the alicyclic amine, alicyclic diamines, e.g., alicyclic primary diamines such as cyclopropanediamine, and cyclohexanecliamine; alicyclic secondary diamines such as bisaminomethylcyclohexane; and alicyclic tertiary diamines such as N,N,N',N'-tetramethyl-cyclohexanecliamine, and bis(ethylmethylamino)cyclohexane; may be typically preferably exemplified. Further, as the heterocyclic amine, heterocyclic diamines, e.g., heterocyclic primary diamines such as isophoronecliamine; heterocyclic secondary diamines such as piperazine, and dipiperidylpropane; and heterocyclic tertiary diamines such as N,N-climethylpiperazine, and bismethylpiperidylpropane; may be typically preferably exemplified.

The number of carbon atoms in the alicyclic amine, or the heterocyclic amine is preferably 3 or more, more preferably 4 or more, and the upper limit is preferably 16 or less, more preferably 14 or less.

Further, as the aromatic amine, aromatic diamines, e.g., aromatic primary diamines such as phenyl diamine, tolylene diamine, and naphthalene diamine; aromatic secondary diamines such as N-methylphenylenediamine, N,N'-dimethylphenylenecliamine, N,N'-bismethylphenylphenylenediamine, N,N'-dimethylnaphthalenecliamine, and N-naphthylethylenecliamine; and aromatic tertiary diamines such as N,N-dimethylphenylenecliamine, N,N,N',N'-tetramethylphenylenecliamine, N,N,N',N'-tetramethykliaminocliphenylmethane, and N,N,N',N'-tetramethylnaphthalenecliamine may be typically preferably exemplified.

The number of carbon atoms of the aromatic amine is preferably 6 or more, more preferably 7 or more, further preferably 8 or more, and the upper limit is preferably 16 or less, more preferably 14 or less, further preferably 12 or less.

The amine compound used in the present embodiment may be substituted with a substituent such as an alkyl group, an alkenyl group, an alkoxy group, a hydroxy group, or a cyano group, or a halogen atom.

Although diamine is exemplified as a specific example, it is needless to say that the amine compound that can be used in the present embodiment is not limited to diamine. It is possible to use, for example, not only aliphatic monoamines corresponding to various diamines such as the aliphatic diamine, e.g., trimethylamine, triethylamine, and ethyldimethylamine, piperidine compounds such as piperidine, methylpipericline, and tetramethylpiperidine, pyridine compounds such as pyridine, and picoline, morpholine compounds such as morpholine, methylmorpholine, and thiomorpholine, imidazole compounds such as imidazole, and methylimidazole, and monoamines, e.g., alicyclic monoamines such as monoamine corresponding to the alicyclic diamine, heterocyclic monoamine corresponding to the heterocyclic diamine, aromatic monoamine corresponding to the aromatic diamine, but also, for example, polyamines having three or more amino groups such as diethylenetriamine, N,N',N"-trimethykliethylenetriamine, N,N,N',N",N"-pentamethykliethylenetriamine, triethylenetetramine, N,N'-bis[(climethylamino)ethyl]-N,N'-dim ethylethylene diamine, hexamethylenetetramine, and tetraethylenepentamine.

Among the above, from the viewpoint of obtaining higher ionic conductivity besides a predetermined average particle size and a specific surface area, tertiary amine having a tertiary amino group as an amino group is preferable, tertiary diamine having two tertiary amino groups is more preferable, tertiary diamine having two tertiary amino groups at both ends is further preferable, and aliphatic tertiary diamine having tertiary amino groups at both ends is still further preferable. Among the amine compounds, as for the aliphatic tertiary diamine having tertiary amino groups at both ends, tetramethylethylenediamine, tetraethylethylenecliamine, tetramethykliaminopropane, and tetraethykliaminopropane are preferable, and in terms of availability, etc. tetramethylethylenediamine, and tetramethyldiaminopropane are preferable.

As a complexing agent other than the amine compound, for example, a compound having a group containing a hetero element e.g., an oxygen element, and a halogen element such as a chlorine element may be exemplified as a complexing agent other than the amine compound, due to its high affinity with a lithium element. Further, an effect similar to this is also obtained by a compound having a group other than an amino group, for example, a group containing a nitrogen element as a hetero element, such as, a nitro group, or an amide group, Examples of the other complexing agent include: alcohol-based solvents such as ethanol, and butanol; ester-based solvents such as ethyl acetate, and butyl acetate; aldehyde-based solvents such as formaldehyde, acetaldehyde, and dimethylformamide, ketone-based solvents such as acetone, and methylethylketone; ether-based solvents such as diethylether, diisopropylether, dibutylether, tetrahydrofuran, dimethoxyethane, cyclopentylmethylether, tert-butylmethylether, and anisole; halogen element-containing aromatic hydrocarbon solvents such as trifluoromethylbenzene, nitrobenzene, chlorobenzene, chlorotoluene, and bromobenzene; and solvents containing a carbon atom and a hetero atom such as acetonitrile, dimethylsulfoxide, and carbon disulfide. Among these, ether-based solvents are preferable, diethylether, diisopropylether, dibutylether, and tetrahydrofuran are more preferable, and diethylether, diisopropylether, and dibutylether are further preferable.

When the raw material component is mixed with the complexing agent, due to the action of the lithium atom, the sulfur atom, the phosphorus atom and the halogen atom contained in the raw material component and the complexing agent, a complex is obtained in which these atoms are bonded directly to each other with and/or without the complexing agent. That is, in the solid electrolyte production method of the present embodiment, the complex obtained by mixing the raw material component with the complexing agent is composed of the complexing agent, the lithium atom, the sulfur atom, the phosphorus atom and the halogen atom. The complex obtained in the present embodiment is not completely dissolved in a liquid complexing agent, and is usually a solid. Thus, in the present embodiment, a complex and a suspension of a complex and the complex suspended in a solvent added as necessary is obtained. Therefore, the solid electrolyte production method of the present embodiment corresponds to a heterogeneous system in a so-called liquid phase method.

(Solvent)

In the present embodiment, when the raw material component and the complexing agent are mixed, a solvent may be further added.

When a solid complex is formed in a liquid complexing agent, if the complex is easily soluble in the complexing agent, component separation may occur in some cases. Therefore, by using a solvent in which the complex is not dissolved, it is possible to suppress component elution in the electrolyte precursor. Further, when the solvent is used in mixing the raw material component with the complexing agent, the complex formation is promoted, and each main component can more evenly exist. Then, since an electrolyte precursor in which halogen atoms are more dispersively fixed is obtained, as a result, the effect of obtaining high ionic conductivity is easily exhibited.

The production method of the sulfide solid electrolyte of the present embodiment is a so-called heterogeneous method, and it is preferable that the complex is precipitated without being completely dissolved in the liquid complexing agent. It is possible to adjust the solubility of the complex by adding the solvent. Especially, halogen atoms are easily eluted from the complex, and thus, through addition of the solvent, the elution of the halogen atoms can be suppressed and a desired complex can be obtained. As a result, a crystalline sulfide solid electrolyte having high ionic conductivity can be obtained via an electrolyte precursor in which components such as halogen are dispersed. Thus, this is preferable.

As a solvent having this property, a solvent having a solubility parameter of 10 or less may be preferably exemplified. In the present specification, the solubility parameter is described in various documents such as, for example, "Chemical Handbook" (issued in 2004, revised 5th edition, Maruzen Petrochemical Co., Ltd.), and then is a value $\delta((cal/cm^3)^{1/2})$ calculated by the following mathematical formula (1), and is also called a Hildebrand parameter, a SP value.

$$\delta=\sqrt{(\Delta H-RT)/V} \qquad (1)$$

(In the mathematical formula (1), ΔH is the molar exotherm, R is the gas constant, T is the temperature, and V is the molar volume)

Due to the use of the solvent having a solubility parameter of 10 or less, a halogen atom, a halogen atom-containing raw material such as lithium halide, and further a halogen atom-containing component constituting co-crystals included in the complex (for example, an aggregate in which lithium halide and the complexing agent are combined) can be placed in a state where they are relatively difficult to dissolve as compared to the complexing agent. Then, it becomes easy to fix halogen atoms in the complex, and the halogen atoms are present in a good dispersion state in the obtained electrolyte precursor, and further the solid electrolyte. Thus, the solid electrolyte having high ionic conductivity is easily obtained. That is, it is preferable that the solvent used in the present embodiment has a property of complex insolubility. From a similar viewpoint, the solubility parameter of the solvent is preferably 9.5 or less, more preferably 9.0 or less, further preferably 8.5 or less.

As for the solvent used in the present embodiment, more specifically, solvents that have been conventionally used in the production of the solid electrolyte can be widely adopted, and preferred is at least one selected from non-polar solvents and aprotic polar solvents, Among these, those having a solubility parameter preferably within the above range may be appropriately selected and used. Examples thereof include hydrocarbon solvents such as an aliphatic hydrocarbon solvent, an alicyclic hydrocarbon solvent, and an aromatic hydrocarbon solvent; and carbon atom-containing solvents such as an alcohol-based solvent, an ester-based solvent, an aldehyde-based solvent, a ketone-based solvent, an ether-based solvent having 4 or more carbon atoms on one side, and a solvent containing carbon atoms and hetero atoms. Among these, those having a solubility parameter preferably within the above range may be appropriately selected and used.

More specific examples thereof include aliphatic hydrocarbon solvents such as hexane (7.3), pentane (7.0), 2-ethylhexane, heptane (7.4), octane (7.5), decane, undecane, dodecane, and tridecane; alicyclic hydrocarbon solvents such as cyclohexane (8.2), and methylcyclohexane; aromatic hydrocarbon solvents such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; alcohol-based solvents such as ethanol (12.7), and butanol (11.4); aldehyde-based solvents such as formaldehyde, acetaldehyde (10.3), and dimethylformamide (12.1); ketone-based solvents such as acetone (9.9), and methylethylketone; ether-based solvents such as dibutylether, cyclopentylmethylether (8.4), tert-butylmethylether, and anisole; and solvents containing carbon atoms and hetero atoms such as acetonitrile (11.9), dimethylsulfoxide, and carbon disulfide. In the examples, the numerical values in the parentheses are SP values.

Among these solvents, an aliphatic hydrocarbon solvent, an alicyclic hydrocarbon solvent, an aromatic hydrocarbon solvent, and an ether-based solvent are preferable. From the viewpoint of more stably obtaining high ionic conductivity, heptane, cyclohexane, toluene, ethylbenzene, diethylether, diisopropylether, dibutylether, dimethoxyethane, cyclopentylmethylether, tert-butylmethylether, and anisole are more preferable, diethylether, diisopropylether, and dibutylether are further preferable, diisopropylether, and dibutylether are still further preferable, and cyclohexane is particularly preferable. The solvent used in the present embodiment is preferably the exemplified organic solvent and is an organic solvent different from the complexing agent. In the present embodiment, these solvents may be used alone or in combination of two or more types.

(Drying)

In the present embodiment, the electrolyte precursor is a suspension in many cases, and thus a drying step may be included. Accordingly, powder of the electrolyte precursor is obtained. Drying prior to heating to be described later is preferable because it becomes possible to efficiently perform heating. The drying, and the subsequent heating may be performed in the same process.

The drying may be performed at a temperature depending on the types of the complexing agent and the solvent remaining in the electrolyte precursor. For example, it can be performed at a temperature equal to or higher than the boiling point of the complexing agent or the solvent. Further, usually at 5 to 100° C., preferably at 10 to 85° C., more preferably at 15 to 70° C., still further preferably at about room temperature (23° C.) (e.g., about room temperature ±5° C.), drying (vacuum drying) under a reduced pressure can be performed by using a vacuum pump or the like so as to volatilize the complexing agent and the solvent.

Unlike the complexing agent, the solvent is hardly incorporated into the complex. Thus, the content of the solvent in the complex may be usually 3% by mass or less, preferably 2% by mass or less, more preferably 1% by mass or less.

Further, the drying may be performed through filtration using a glass filter or the like, solid-liquid separation by decantation, or solid-liquid separation using a centrifugal separator or the like. In the present embodiment, after the solid-liquid separation is performed, drying may be performed under the temperature conditions.

Specifically, the solid-liquid separation is easily performed through decantation, in which after the suspension is transferred to a container, and the solid is precipitated, a complexing agent and a solvent added as necessary which become a supernatant are removed, or through filtration using, for example, a glass filter having a pore size of about 10 to 200 μm, preferably 20 to 150 μm.

Figure 4:
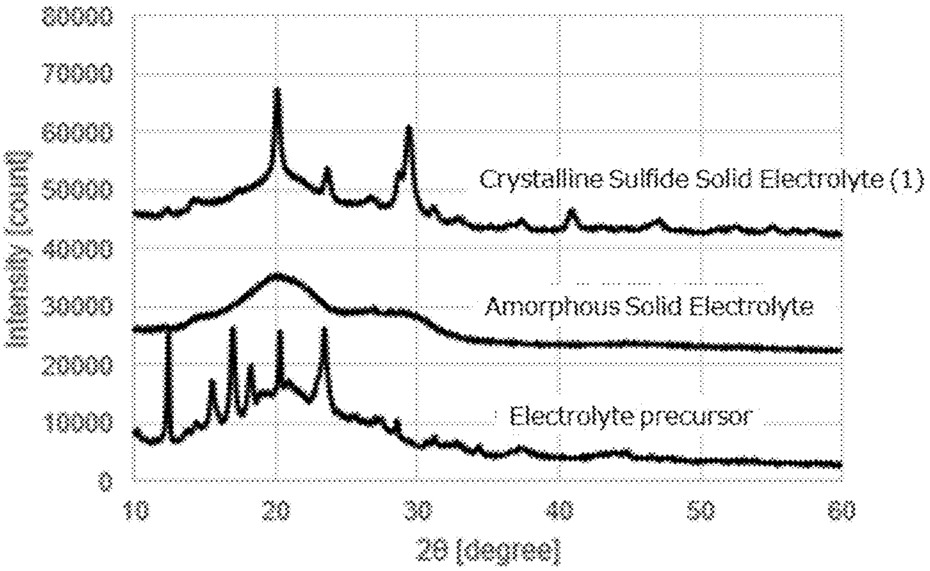
FIG. 4 is XRD patterns of a powdery electrolyte precursor, a powdery amorphous solid electrolyte and a crystalline sulfide solid electrolyte (1) prepared in (2-1) Preparation of crystalline sulfide solid electrolyte (1) (liquid phase method)

The complex is composed of the complexing agent, the lithium atom, the sulfur atom, the phosphorus atom and the halogen atom, and is characterized in that peaks different from raw material-derived peaks are observed in the X-ray diffraction pattern in the X-ray diffraction measurement. It preferably includes co-crystals composed of the complexing agent, the lithium atom, the sulfur atom, the phosphorus atom and the halogen atom. Raw material-derived peaks are observed only by simply mixing only raw materials, whereas peaks different from the raw material-derived peaks are observed by mixing the raw materials and the complexing agent. Thus, the complex has a structure clearly different from the raw materials' own structure included in the raw materials. This was specifically confirmed in Examples. FIG. 4 illustrates measurement examples of X-ray diffraction patterns of the electrolyte precursor, the amorphous solid electrolyte and the crystalline sulfide solid electrolyte (1) prepared in (2-1) preparation of crystalline sulfide solid electrolyte (1) (liquid phase method). From the X-ray diffraction patterns, it can be found that the electrolyte precursor has a predetermined crystal structure. Further, the diffraction pattern does not include a diffraction pattern of any raw material such as lithium sulfide, and thus it can be found that the electrolyte precursor has a different crystal structure from the raw materials.

Further, the electrolyte precursor is characterized in that it has a different structure from the crystalline sulfide solid electrolyte. This was also specifically confirmed in Examples. FIG. 4 also illustrates the X-ray diffraction pattern of the crystalline sulfide solid electrolyte (1) prepared in (2-1) preparation of crystalline sulfide solid electrolyte (1) (liquid phase method), and it can be found that the diffraction pattern is different from that of the electrolyte precursor. The electrolyte precursor has a predetermined crystal structure, and is different from the amorphous solid electrolyte having a broad pattern illustrated in FIG. 4.

The content of the complexing agent in the electrolyte precursor varies according to the molecular weight of the complexing agent, but is usually about 10% by mass to 70% by mass, preferably 15% by mass to 65% by mass.

(Heating)

It is preferable that the production method of the sulfide solid electrolyte of the present embodiment includes heating the electrolyte precursor thereby obtaining an (amorphous or crystalline) sulfide solid electrolyte (decomposed complex).

Since the step of heating the electrolyte precursor is included, the complexing agent in the electrolyte precursor is removed, so that a decomposed complex containing the lithium atom, the sulfur atom, and the phosphorus atom and the halogen atom as necessary is obtained. Here, the fact that the complexing agent in the electrolyte precursor is removed is supported by not only the fact that it is evident that the complexing agent constitutes the co-crystals of the electrolyte precursor from the results of the X-ray diffraction pattern, and the gas chromatography analysis, but also the fact that the X-ray diffraction pattern of the solid electrolyte obtained by removing the complexing agent through heating of the electrolyte precursor is identical to that of the solid electrolyte obtained by the conventional method without using the complexing agent.

In the present embodiment, the sulfide solid electrolyte is obtained by heating the electrolyte precursor and removing the complexing agent in the electrolyte precursor. Then, although it is preferable that the content of the complexing agent in the sulfide solid electrolyte is as small as possible, the complexing agent may exist to an extent that the performance of the sulfide solid electrolyte is not impaired. The content of the complexing agent in the sulfide solid electrolyte may be usually 10% by mass or less, preferably 5% by mass or less, more preferably 3% by mass or less, further preferably 1% by mass or less.

For example, when the sulfide solid electrolyte is obtained, the heating temperature of the electrolyte precursor may be determined according to the structure of the sulfide solid electrolyte to be obtained by heating the electrolyte precursor. Specifically, when the electrolyte precursor is subjected to a differential thermal analysis (DTA) using a differential thermal analysis device (DTA device) at a temperature rise condition of 10° C./min, the heating temperature may preferably fall within a range of 5° C. or less from a starting point that is a peak top temperature of an exothermic peak observed on the lowest temperature side, more preferably of 10° C. or less, further preferably of 20° C. or less. The lower limit is not particularly limited, but may be about −40° C. or more from the peak top temperature of the exothermic peak observed on the lowest temperature side. By setting this temperature range, the sulfide solid electrolyte is more efficiently and reliably obtained. The heating temperature in obtaining the sulfide solid electrolyte varies depending on the structure of the sulfide solid electrolyte to be obtained, and thus cannot be generally defined, but is usually preferably 135° C. or less, more preferably 130° C. or less, further preferably 125° C. or less. The lower limit is not particularly limited, but is preferably 90° C. or more, more preferably 100° C. or more, further preferably 110° C. or more.

The heating time is not particularly limited as long as a desired sulfide solid electrolyte is obtained, but the time is, for example, preferably 1 min or more, more preferably 10 min or more, further preferably 30 min or more, still further preferably 1 h or more. Further, the upper limit of the heating time is not particularly limited, but is preferably 24 h or less, more preferably 10 h or less, further preferably 5 h or less, still further preferably 3 h or less.

Further, the heating is preferably performed in an inert gas atmosphere (e.g., a nitrogen atmosphere, an argon atmosphere), or a reduced pressure atmosphere (especially in a vacuum). This is because deterioration (for example, oxidation) of the sulfide solid electrolyte can be prevented. The heating method is not particularly limited, but examples thereof include methods using a hot plate, a vacuum heating device, an argon gas atmosphere furnace, and a firing furnace. Further, industrially, a lateral dryer having a heating means and a feed mechanism, a lateral vibrating fluid dryer, etc. can also be used, and may be selected according to the throughput of a heating.

(Crystallization)

In the present embodiment, an amorphous sulfide solid electrolyte or an amorphous modified sulfide solid electrolyte to be described later may be crystallized as necessary to form a crystalline sulfide solid electrolyte or a crystalline modified sulfide solid electrolyte to be described later. This is preferable because ionic conductivity is increased due to crystallization.

When a crystalline sulfide solid electrolyte or a crystalline modified sulfide solid electrolyte is obtained by heating (crystallizing) an amorphous sulfide solid electrolyte or an amorphous modified sulfide solid electrolyte, the heating temperature may be determined according to the structure of the crystalline sulfide solid electrolyte or the crystalline modified sulfide solid electrolyte, and is preferably higher than the heating temperature for obtaining the sulfide solid electrolyte through decomplexation. Specifically, when the amorphous sulfide solid electrolyte or the amorphous modified sulfide solid electrolyte is subjected to a differential thermal analysis (DTA) using a differential thermal analysis device (DTA device) at a temperature rise condition of 10° C./min, the temperature may preferably fall within a range of 5° C. or more from a starting point that is a peak top temperature of an exothermic peak observed on the lowest temperature side, more preferably of 10° C. or more, further preferably of 20° C. or more. The upper limit is not particularly limited, but may be about 40° C. or less. By setting this temperature range, the crystalline sulfide solid electrolyte or the crystalline modified sulfide solid electrolyte is more efficiently and reliably obtained. The heating temperature in obtaining the crystalline sulfide solid electrolyte or the crystalline modified sulfide solid electrolyte varies depending on the structure of the crystalline sulfide solid electrolyte or the crystalline modified sulfide solid electrolyte to be obtained, and thus cannot be generally defined, but is usually preferably 130° C. or more, more preferably 135° C. or more, further preferably 140° C. or more. The upper limit is not particularly limited, but is preferably 300° C. or less, more preferably 280° C. or less, further preferably 250° C. or less.

(Pulverization)

In the present embodiment, it is desirable that pulverizing the electrolyte precursor, the sulfide solid electrolyte or the modified sulfide solid electrolyte as necessary is included. By pulverizing the electrolyte precursor, the sulfide solid electrolyte or the modified sulfide solid electrolyte, a solid electrolyte having a small particle size is obtained. Further, the reduction of ionic conductivity can be suppressed.

The pulverizer used for pulverizing the electrolyte precursor, the sulfide solid electrolyte or the modified sulfide solid electrolyte is not particularly limited as long as it can pulverize particles. For example, a medium-type pulverizer using a pulverization medium can be used. When the electrolyte precursor is in a liquid state or a slurry state mainly accompanied by a liquid such as a complexing agent, or a solvent, a wet pulverizer that can handle wet pulverization is preferable.

Typical examples of the wet pulverizer include a wet bead mill, a wet ball mill, and a wet vibration mill, and the wet bead mill using beads as a pulverization medium is preferable because it is possible to freely adjust conditions for a pulverizing operation, and it is easy to handle smaller particle sizes. Further, it is also possible to use dry pulverizers, e.g., dry medium-type pulverizers such as a dry bead mill, a dry ball mill, and a dry vibration mill, and dry non-medium pulverizers such as a jet mill.

Further, the electrolyte precursor to be pulverized by the pulverizer is usually supplied as an electrolyte precursor-containing material obtained by mixing the raw material component and the complexing agent. That is, a target material to be pulverized by a pulverizer, which is mainly supplied in a liquid state or a slurry state, becomes mainly an electrolyte precursor-containing liquid or an electrolyte precursor-containing slurry. Therefore, the pulverizer used in the present embodiment is preferably a flow-type pulverizer, which can perform a circulation operation in which the electrolyte precursor-containing liquid or the electrolyte precursor-containing slurry is circulated as necessary. More specifically, as described in JP 2010-140893 A, it is preferable to use a pulverizer having a mode of circulation between a pulverizer of pulverizing a slurry (pulverization mixer), and a temperature keeping bath (reaction vessel).

The size of beads used in the pulverizer may be appropriately selected according to a desired particle size, a throughput, etc. For example, the diameter of beads may be about 0.05 mmφ to 5.0 mmφ, preferably 0.1 mmφ to 3.0 mmφ, more preferably 0.3 mmφ to 1.5 mmφ.

As for the pulverizer used for pulverization, it is possible to use a machine capable of pulverizing a target by using ultrasonic waves, for example, a machine called an ultrasonic pulverizer, an ultrasonic homogenizer, a probe ultrasonic pulverizer or the like.

In this case, various conditions such as the frequency of ultrasonic waves may be appropriately selected according to the average particle size, etc. of a desired electrolyte precursor. The frequency may be, for example, about 1 kHz to 100 kHz, and is preferably 3 kHz to 50 kHz, more preferably 5 kHz to 40 kHz, further preferably 10 kHz to 30 kHz from the viewpoint of more efficiently pulverizing the electrolyte precursor.

Further, the output of the ultrasonic pulverizer may be usually about 500 to 16,000 W, preferably 600 to 10,000 W, more preferably 750 to 5,000 W, further preferably 900 to 1,500 W.

The average particle size ($D_{50}$) of each solid electrolyte obtained by pulverization is appropriately determined as desired, but is usually 0.01 μm to 50 μm, preferably 0.03 μm to 5 μm, more preferably 0.05 μm to 3 μm. By setting this average particle size, it is possible to meet the demand for a solid electrolyte with a small particle size of 3 μm or less as an average particle size.

The pulverization time is not particularly limited as long as during the time, a desired average particle size of each solid electrolyte is obtained. It is usually 0.1 h to 100 h, and is preferably 0.3 h to 72 h, more preferably 0.5 h to 48 h, further preferably 1 h to 24 h from the viewpoint of efficiently obtaining a desired size as a particle size.

The average particle diameter ($D_{50}$) in the present specification is a value measured by a laser diffraction particle size distribution measurement method, and can be measured by, for example, the method described in Examples.

[Modified Sulfide Solid Electrolyte]

A modified sulfide solid electrolyte of the present embodiment preferably contains α parts by mass of $Li_2S$ and (100-α) parts by mass of a sulfide solid electrolyte [(1-X-Y)($0.75Li_2S/0.25P_2S_5$)/XLiBr/YLiI] (in the formula, X represents a number of 0 to 0.2, and Y represents a number of 0 to 0.2).

Further, its shape is preferably particulate, and it is preferable that a layer having a high $Li_2S$ content (also referred to as a coating layer in the present specification) is present on the particle surface. The "layer" may have a shape that completely covers the particle surface of the sulfide solid electrolyte (also referred to as coating in the present specification), or a shape that covers a part thereof, or may be distributed in an island shape on the particle surface of the sulfide solid electrolyte. Otherwise, particulate $Li_2S$ may adhere to the surface of the sulfide solid electrolyte.

Further, the sulfide solid electrolyte and $Li_2S$ may be physically adsorbed, or may be partially mixed, or a layer having a higher $Li_2S$ content than the composition of the sulfide solid electrolyte may be formed on the surface of the sulfide solid electrolyte.

In the modified sulfide solid electrolyte of the present embodiment, the pH value in a 1% by mass aqueous solution of the modified sulfide solid electrolyte is preferably 9.0 or more.

The pH value is preferably 9.0 or more, more preferably 10.00 or more, further preferably 10.50 or more, from the viewpoint of suppressing the reduction of ionic conductivity, and reducing the generation amount of $H_2S$ gas even if the sulfide solid electrolyte comes in contact with moisture and $H_2S$ is generated. The upper limit value is not particularly limited, and may be greater than 14.00, or 14.00 or less, or may be 13.00 or less or 12.00 or less.

The modified sulfide solid electrolyte of the present embodiment may be a crystalline modified sulfide solid electrolyte or an amorphous modified sulfide solid electrolyte, but is preferably a crystalline modified sulfide solid electrolyte obtained by performing the crystallization at any stage so that a high ionic conductivity is achieved.

The crystalline modified sulfide solid electrolyte may be obtained by performing modification of the present embodiment on the crystalline sulfide solid electrolyte, or the crystalline modified sulfide solid electrolyte may be obtained by crystallizing the amorphous modified sulfide solid electrolyte.

The crystalline sulfide solid electrolyte and the crystalline modified sulfide solid electrolyte may be so-called glass ceramics. Examples of its crystal structure include a $Li_3PS_4$ crystal structure, a $Li_4P_2S_6$ crystal structure, a $Li_7PS_6$ crystal structure, a $Li_7P_3S_{11}$ crystal structure, and a crystal structure having peaks near 2θ=20.2° and near 23.6° (for example, JP 2013-16423 A).

It is preferable that the modified sulfide solid electrolyte includes a thio-LISICON Region II type crystal structure, because the ionic conductivity is increased.

Further, examples thereof include: a $Li_{4-x}Ge_{1-x}P_xS_4$-based thio-LISICON Region II type crystal structure (see Kanno et al., Journal of The Electrochemical Society, 148(7) A742-746(2001)), and a crystal structure similar to the $Li_{4-x}Ge_{1-x}P_xS_4$-based thio-LISICON Region II type (see Solid State Ionics, 177(2006), 2721-2725). Among the above, the thio-LISICON Region II type crystal structure is preferable as the crystal structure of the crystalline sulfide solid electrolyte and the crystalline modified sulfide solid electrolyte obtained by the present production method because higher ionic conductivity is obtained. Here, the "thio-LISICON Region II type crystal structure" refers to either the $Li_{4-x}Ge_{1-x}P_xS_4$-based thio-LISICON Region II type crystal structure, or the crystal structure similar to the $Li_{4-x}Ge_{1-x}P_xS_4$-based thio-LISICON Region II type. Further, the crystalline sulfide solid electrolyte and the crystalline modified sulfide solid electrolyte obtained by the present production method preferably include the thio-LISICON Region II type crystal structure, or may have it as a main crystal. However, from the viewpoint of obtaining higher ionic conductivity, it is preferable to have it as a main crystal. In the present specification, "having as a main crystal" means that the ratio of the target crystal structure accounts for 80% or more in the crystal structure, preferably for 90% or more, more preferably for 95% or more. Further, from the viewpoint of obtaining higher ionic conductivity, it is preferable that the crystalline sulfide solid electrolyte and the crystalline modified sulfide solid electrolyte obtained by the present production method do not contain crystalline $Li_3PS_4$(β-$Li_3PS_4$).

In the X-ray diffraction measurement using a CuKα ray, diffraction peaks of the $Li_3PS_4$ crystal structure appear near, for example, 2θ=17.5°, 18.3°, 26.1°, 27.3°, and 30.0°, diffraction peaks of the $Li_4P_2S_6$ crystal structure appear near, for example, 2θ=16.9°, 27.1°, and 32.5°, diffraction peaks of the $Li_7PS_6$ crystal structure appear near, for example, 2θ=15.3°, 25.2°, 29.6°, and 31.0°, diffraction peaks of the $Li_7P_3S_{11}$ crystal structure appear near, for example, 2θ=17.8°, 18.5°, 19.7°, 21.8°, 23.7°, 25.9°, 29.6°, and 30.0°, diffraction peaks of the $Li_{4-x}Ge_{1-x}P_xS_4$-based thio-LISICON Region II type crystal structure appear near, for example, 2θ=20.1°, 23.9°, and 29.5°, and diffraction peaks of the crystal structure similar to the $Li_{4-x}Ge_{1-x}P_xS_4$-based thio- LISICON Region II type appear near, for example, 20=20.2, and 23.6°. Such a peak position may be smaller or larger within a range of ±0.5°.

Figure 10:
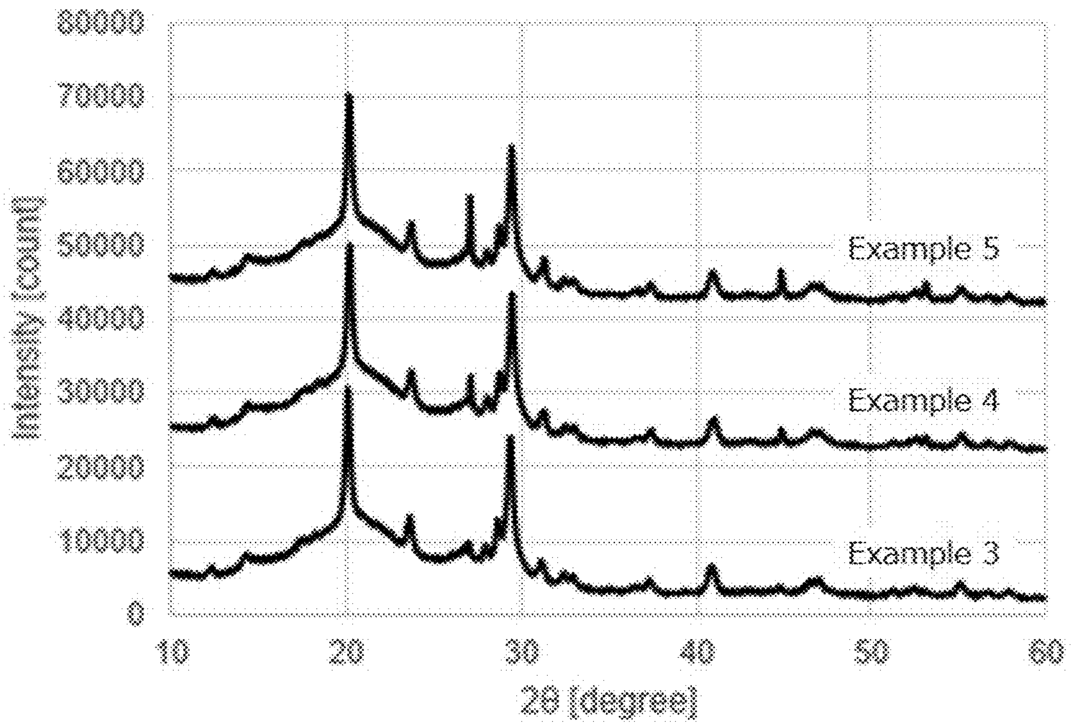
FIG. 10 is XRD patterns of crystalline modified sulfide solid electrolytes produced in Examples 3 to 5.

As described above, when the thio-LISICON Region II type crystal structure is obtained in the present embodiment, it is preferable that the crystalline $Li_3PS_4$(13-$Li_3PS_4$) is not included. FIG. 10 illustrates X-ray diffraction measurement examples of the crystalline modified sulfide solid electrolytes obtained by the present production method. As can be seen from FIGS. 4 and 10, the crystalline sulfide solid electrolyte and the crystalline modified sulfide solid electrolyte of the present embodiment do not have diffraction peaks at 20=17.5° and 26.1° observed for the crystalline $Li_3PS_4$. Otherwise, even in a case where those are included, the detected peaks are very smaller than the diffraction peak of the thio-LISICON Region II type crystal structure.

In the crystalline modified sulfide solid electrolyte, a $Li_2S$ peak, i.e., a peak at 2θ=27.45° can be confirmed due to modification.

A crystal structure having the structural skeleton of $Li_7PS_6$ and represented by a composition formula $Li_{7-x}P_{1-y}Si_yS_6$ or $Li_{7+x}P_{1-y}Si_yS_6$(x is −0.6 to 0.6, and y is 0.1 to 0.6) in which a part of P is replaced with Si is cubic or orthorhombic, preferably cubic, and has peaks mainly appearing at positions 20=15.5°, 18.0°, 25.0°, 30.0°, 31.4°, 45.3°, 47.0°, and 52.0° in the X-ray diffraction measurement using a CuKα ray. A crystal structure represented by the composition formula $Li_{7-x-2y}PS_{6-x-y}Cl_x$ (0.8<x<1.7, 0<y<−0.25x+0.5) is preferably cubic, and has peaks mainly appearing at positions 20=15.5°, 18.0°, 25.0°, 30.0°, 31.4°, 45.3°, 47.0°, and 52.0° in the X-ray diffraction measurement using a CuKα ray. Further, a crystal structure represented by the composition formula $Li_{7-x}S_6Ha_x$ (Ha is Cl or Br, and x is preferably 0.2 to 1.8) is preferably cubic, and has peaks mainly appearing at positions 20=15.5°, 18.0°, 25.0°, 30.0°, 31.4°, 45.3°, 47.0°, and 52.0° in the X-ray diffraction measurement using a CuKα ray.

Such a peak position may be smaller or larger within a range of ±0.5°.

Further, for the crystalline sulfide solid electrolyte and the crystalline modified sulfide solid electrolyte obtained by the present production method, in the X-ray diffraction measurement using CuKα rays, the half width of the maximum peak including a background at 2θ=10 to 40° is preferably Δ2θ=0.32 or less. When these properties are present, a higher ionic conductivity is obtained, thereby improving a battery performance. From the similar viewpoint, the half width of the maximum peak is more preferably Δ2θ=0.30 or less, further preferably Δ2θ=0.28 or less.

As for the crystalline sulfide solid electrolyte and the crystalline modified sulfide solid electrolyte having these properties, those having a thio-LISICON Region II type crystal structure may be typically exemplified.

For example, FIG. 10 illustrates an X-ray diffraction measurement example of the crystalline modified sulfide solid electrolyte having the thio-LISICON Region II type crystal structure obtained in Example 3. The maximum peak including the background at 2θ=10 to 40° is a peak at 20.1°, and it can be found that the peak has a sharp peak with a half width of A2θ=0.25. In this way, since the maximum peak has a sharp peak with a half width of 0.32 or less, it can be expected that the crystalline modified sulfide solid electrolyte exhibits extremely high ionic conductivity, thereby achieving improvement of a battery performance. Having such a half width indicates having good crystallinity. Accordingly, crushing is possible with a small amount of energy, so that the ionic conductivity reduction caused by vitrification (amorphization) is unlikely to occur. Further, the precursor for mechanical treatment of the present embodiment has a porous structure with a relatively large specific surface area and has good crystallinity. Thus, even if a part or all is vitrified by crushing and granulation, a change in morphology during recrystallization is relatively suppressed, so that the morphology can be easily adjusted by the mechanical treatment.

The calculation of the half width can be obtained as follows.

A range of maximum peak±2° is used. Assuming that the ratio of Lorentz function is A (0≤A≤1), the peak intensity correction value is B, the 20 maximum peak is C, the peak position in a range used for calculation)(C±2° is D, the half width is E, the background is F, and each peak intensity of a peak range used for calculation is G, when variables are A, B, C, D, E, and F, the following calculation is performed for each peak position.

$$H=G-\{B\times\{A/(1+(D-C)^2/E^2)+(1-A)\times\exp(-1\times(D-C)^2/E^2)\}+F\}$$

The half width can be obtained by summing H's within a range of the peak C±2° to be calculated, and minimizing the total value by GRG non-linearity with the solver function of the spreadsheet software Excel (Microsoft).

The shape of the crystalline sulfide solid electrolyte and the crystalline modified sulfide solid electrolyte is not particularly limited, but may be, for example, particulate. The average particle size ($D_{50}$) of the particulate crystalline modified sulfide solid electrolyte can be exemplified in the ranges of, for example, 0.01 μm to 500 μm, and 0.1 to 200 μm.

The volume-based average particle size of the crystalline sulfide solid electrolyte and the crystalline modified sulfide solid electrolyte obtained by the present production method is 3 μm or more which is the same as the average particle size of the modified sulfide solid electrolyte of the present embodiment.

Further, the specific surface area measured by a BET method on the crystalline sulfide solid electrolyte and the crystalline modified sulfide solid electrolyte obtained by the present production method is 20 $m^2/g$ or more which is the same as the specific surface area of the modified sulfide solid electrolyte of the present embodiment.

(Use of Modified Sulfide Solid Electrolyte)

The modified sulfide solid electrolyte of the present embodiment has a predetermined average particle size and a specific surface area, and has high ionic conductivity, and thus has excellent battery performance. Further, since $H_2S$ is hardly generated, it is suitably used for electrode combined materials for lithium ion batteries and the lithium ion batteries.

This is particularly suitable when a lithium element is adopted as a conductive species. The modified sulfide solid electrolyte of the present embodiment may be used for a positive electrode layer, may be used for a negative electrode layer, or may be used for an electrolyte layer.

Further, in addition to the positive electrode layer, the electrolyte layer and the negative electrode layer, a current collector is preferably used for the battery, and as for the current collector, those that have been conventionally known can be used. For example, it is possible to use a layer of Au, Pt, Al, Ti, Cu or the like reacting with the modified sulfide solid electrolyte, which is covered with Au, etc.

[Electrode Combined Material]

The electrode combined material of the present embodiment needs to contain the modified sulfide solid electrolyte and an electrode active material to be described later.

(Electrode Active Material)

As for the electrode active material, each of a positive electrode active material, and a negative electrode active material is employed depending on whether the electrode combined material is used for a positive electrode, or a negative electrode.

As for the positive electrode active material, any material can be used without any particular limitation as long as it can promote a battery chemical reaction involving the lithium ion movement caused by an atom employed as an atom exhibiting ionic conductivity, preferably a lithium atom, in relation to the negative electrode active material. Examples of this positive electrode active material capable of inserting/releasing lithium ions include oxide-based positive electrode active materials and sulfide-based positive electrode active materials.

Preferable examples of the oxide-based positive electrode active material include lithium-containing transition metal composite oxides such as LMO (lithium manganese oxide), LCO (lithium cobalt oxide), NMC (lithium nickel manganese cobalt oxide), NCA (lithium nickel cobalt aluminum oxide), LNCO (lithium cobalt nickel oxide), and an olivine-type compound ($LiMeNPO_4$, Me=Fe, Co, Ni, Mn).

Examples of the sulfide-based positive electrode active material include titanium sulfide ($TiS_2$), molybdenum sulfide ($MoS_2$), iron sulfide (FeS, $FeS_2$), copper sulfide (CuS), and nickel sulfide ($Ni_3S_2$).

Further, besides the positive electrode active materials, niobium selenide ($NbSe_3$) or the like can also be used.

The positive electrode active material may be used alone, or in combination of two or more types thereof.

As for the negative electrode active material, it is possible to use any material, e.g., a metal capable of forming an alloy with an atom employed as an atom exhibiting ionic conductivity (preferably, a lithium atom), an oxide thereof, and an alloy of the metal and the lithium atom, without any particular limitation, as long as it is possible to promote a battery chemical reaction involving the lithium ion movement preferably caused by the lithium atom. As this negative electrode active material capable of inserting/releasing lithium ions, those that have been conventionally known as a negative electrode active material in the field of batteries can be employed without any limitation.

Examples of such a negative electrode active material include metallic lithium or metals capable of forming alloys with metallic lithium, such as metallic lithium, metallic indium, metallic aluminum, metallic silicon, and metallic tin, oxides of these metals, and alloys of these metals and metallic lithium.

The electrode active material used in the present embodiment may have a coated surface, that is, a coating layer.

Examples of the material for forming the coating layer include ion conductors, such as nitrides and oxides of an atom exhibiting ionic conductivity in the sulfide solid electrolyte (preferably, a lithium atom), or composites thereof. Specific examples thereof include: lithium nitride ($Li_3N$); a conductor having a LISICON-type crystal structure such as, for example, $Li_{4-2x}Zn_xGeO_4$ in which the main structure is $Li_4GeO_4$; a conductor having a THIO-LISICON-type crystal structure such as, for example, $Li_{4-x}Ge_{1-x}P_xS_4$, which has a $Li_3PO_4$-type skeleton structure; a conductor having a perovskite-type crystal structure such as $La_{2/3-x}Li_{3x}TiO_3$; and a conductor having a NASICON-type crystal structure such as $LiTi_2(PO_4)_3$.

Further, lithium titanates such as $Li_yTi_{3-y}O_4$ ($0<y<3$) and $Li_4Ti_5O_{12}$(LTO), lithium metal oxides of metals belonging to Group 5 of the periodic table, such as $LiNbO_3$, and $LiTaO_3$, and oxide-based conductors such as $Li_2O—B_2O_3—P_2O_5$-based, $Li_2O—B_2O_3—ZnO$-based, and $Li_2O—Al_2O_3—SiO_2—P_2O_5—TiO_2$-based conductors may be exemplified.

The electrode active material having the coating layer is obtained by, for example, attaching a solution containing various atoms that make up the coating layer-forming material to the surface of the electrode active material, and firing the electrode active material preferably at 200° C. to 400° C. after the attachment.

Here, as for the solution containing various atoms, for example, solutions containing alkoxides of various metals such as lithium ethoxide, titanium isopropoxide, niobium isopropoxide, and tantalum isopropoxide may be used. In this case, as for a solvent, alcohol-based solvents such as ethanol, and butanol; aliphatic hydrocarbon solvents such as hexane, heptane, and octane; and aromatic hydrocarbon solvents such as benzene, toluene, and xylene may be used.

Further, the adhesion may be performed by immersion, spray coating, or the like.

The firing temperature is preferably 200° C. to 400° C., more preferably 250° C. to 390° C. from the viewpoint of production efficiency and battery performance improvement, and the firing time is usually about 1 min to 10 h, preferably 10 min to 4 h.

The coverage rate of the coating layer is preferably 90% or more with respect to the surface area of the electrode active material, more preferably 95% or more, further preferably 100%. That is, it is preferable that the entire surface is covered. Further, the thickness of the coating layer is preferably 1 nm or more, more preferably 2 nm or more, and the upper limit is preferably 30 nm or less, more preferably 25 nm or less.

The thickness of the coating layer can be measured through cross-sectional observation on the thickness of the coating layer with a transmission electron microscope (TEM), and the coverage rate can be calculated from the thickness of the coating layer, the element analysis value, and the BET specific surface area.

(Other Components)

The electrode combined material of the present embodiment may contain other components such as for example a conductive material, and a binder, in addition to the modified sulfide solid electrolyte, and the electrode active material. That is, in the manufacturing method of the electrode combined material of the present embodiment, other components such as, for example, a conductive material, and a binder may be used in addition to the modified sulfide solid electrolyte, and the electrode active material. In mixing the modified sulfide solid electrolyte and the electrode active material, other components such as a conductive agent, and a binder may be used by being added and mixed to/with the modified sulfide solid electrolyte and the electrode active material.

Examples of the conductive material may include carbon-based materials such as artificial graphite, graphite carbon fiber, resin calcined carbon, pyrolytic vapor-grown carbon, coke, mesocarbon microbeads, furfuryl alcohol resin calcined carbon, polyacene, pitch-based carbon fiber, vapor grown carbon fiber, natural graphite, and non-graphitizable carbon from the viewpoint of improving electronic conductivity, thereby improving battery performance.

By using the binder, the strength in a case where a positive electrode and a negative electrode are produced is improved.

The binder is not particularly limited as long as it can impart functions such as binding properties, flexibility, etc., and examples thereof may include: fluorine-based polymers such as polytetrafluoroethylene, and polyvinylidene fluoride; thermoplastic elastomers such as butylene rubber, and styrene-butadiene rubber; and various resins such as acryl resin, acrylpolyol resin, polyvinylacetal resin, polyvinylbutyral resin, and silicon resin.

In the electrode combined material, the blending ratio (mass ratio) of the electrode active material and the modified sulfide solid electrolyte is preferably 99.5:0.5 to 40:60, more preferably 99:1 to 50:50, further preferably 98:2 to 60:40 in terms of battery performance improvement, and production efficiency.

When the conductive material is contained, the content of the conductive material in the electrode combined material is not particularly limited, but is preferably 0.5% by mass or more, more preferably 1% by mass or more, further preferably 1.5% by mass or more in terms of battery performance improvement, and production efficiency. The upper limit is preferably 10% by mass or less, preferably 8% by mass or less, further preferably 5% by mass or less.

Further, when the binder is contained, the content of the binder in the electrode combined material is not particularly limited, but is preferably 1% by mass or more, more preferably 3% by mass or more, further preferably 5% by mass or more in terms of battery performance improvement, and production efficiency. The upper limit is preferably 20% by mass or less, preferably 15% by mass or less, further preferably 10% by mass or less.

[Lithium Ion Battery]

The lithium ion battery of the present embodiment is a lithium ion battery including at least one selected from the modified sulfide solid electrolyte of the present embodiment and the electrode combined material, or including at least one selected from the modified sulfide solid electrolyte according to another aspect and the electrode combined material.

The lithium ion battery of the present embodiment is not particularly limited in its configuration as long as it contains either the modified sulfide solid electrolyte of the present embodiment, and the electrode combined material including the same, or the modified sulfide solid electrolyte according to another aspect, and the electrode combined material including the same. It only has to have a configuration of widely used lithium ion batteries.

The lithium ion battery of the present embodiment preferably includes, for example, a positive electrode layer, a negative electrode layer, an electrolyte layer, and a current collector. The electrode combined material of the present embodiment is preferably used for the positive electrode layer and the negative electrode layer, and the modified sulfide solid electrolyte of the present embodiment is preferably used for the electrolyte layer.

Further, as for the current collector, those that have been conventionally known may be used. For example, it is possible to use a layer of Au, Pt, Al, Ti, Cu or the like reacting with the solid electrolyte, which is covered with Au, etc.

EXAMPLE

Next, the present invention will be specifically described with reference to Examples, but the present invention is not limited by these examples at all.

(1) Measurement Method (1-1) Measurement of $H_2S$ Gas Generation Amount

Figure 5:
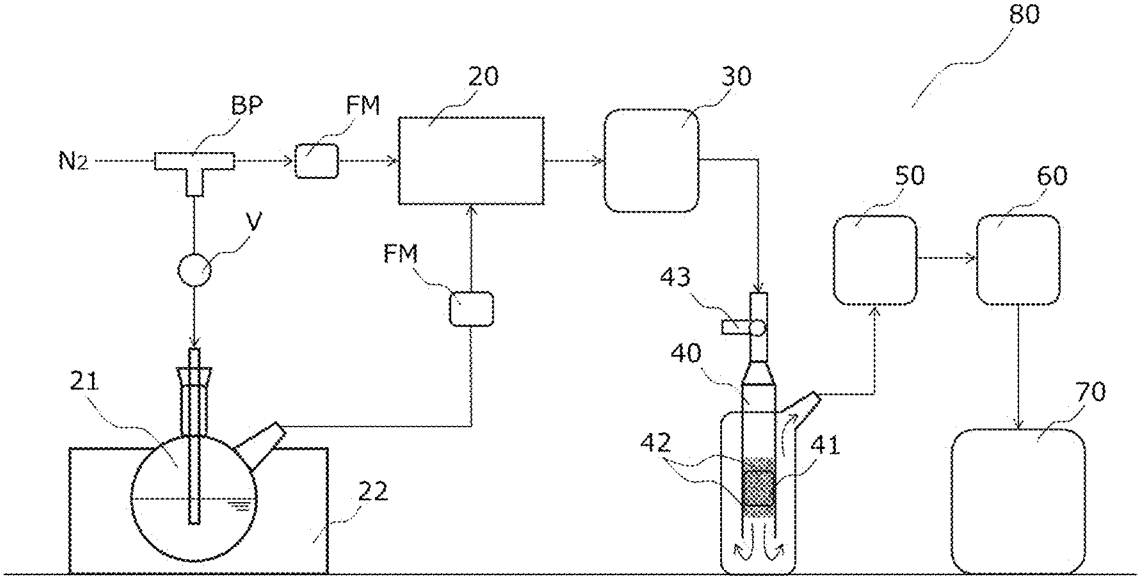
FIG. 5 is an example of a preferable $H_2S$ gas generation amount measuring device.

The generation amount of $H_2S$ gas was measured over time by a device described in FIG. 5. The evaluation was made by the $H_2S$ gas generation amount during the initial stage and entire period as described above.

First, a test device used for an exposure test (an exposure test device 1) will be described by using FIG. 5.

An exposure test device 80 includes main components such as a flask 21 for humidifying air, a static mixer 20 for mixing humidified air and non-humidified air, a dew point meter 30 (M170/DMT152 manufactured by VAISALA) for measuring the moisture of the mixed air, a double reaction tube 40 in which a measurement sample is provided, a dew point meter 50 for measuring the moisture of the air discharged from the double reaction tube 40, and a hydrogen sulfide measuring instrument 60 (Model 3000RS manufactured by AMI) for measuring the $H_2S$ concentration contained in the discharged nitrogen. In its configuration, these are connected through pipes (not illustrated). The temperature of the flask 10 is set as 20° C. by a cooling bath 22.

A Teflon (registered trademark) tube with a diameter of 6 mm was used for the pipe that connects the components. In this drawing, notation of the pipe is omitted, and instead, the flow of nitrogen is indicated by arrows.

The evaluation procedure was as follows.

In a nitrogen glove box with a dew point of −80° C., about 0.15 g of a powder sample (solid electrolyte) 41 was weighed, and was placed inside the reaction tube 40 while interposed between quartz wools 42, followed by sealing. The evaluation was performed at room temperature (20° C.).

Dry air, which was adjusted to a dew point of −55° C. at 0.02 MPa, was supplied from an air source (not illustrated) into the device 1. The supplied air passes through a bifurcated pipe BP, and a part thereof is supplied to the flask 21 and then humidified. The rest is directly supplied to the static mixer 20 as non-humidified air. The amount of air supplied to the flask 21 is adjusted by a needle valve V.

The flow rates of the non-humidified nitrogen and the humidified air are adjusted by flow meters FM with needle valves so that a dew point is controlled. Specifically, the non-humidified air at a flow rate of 100 mL/min and the humidified air at a flow rate of 733 mL/min were supplied to the static mixer 20 and then were mixed. Then, the dew point of the mixed gas (mixture of non-humidified air and humidified air) was checked by the dew point meter 30.

After the dew point was adjusted to 18° C., a point in time, at which a three-way cock 43 was rotated, was set as 0 min, and the mixed gas was allowed to flow through the inside of the reaction tube 40 for the time illustrated in Table 1. The amount of $H_2S$ contained in the mixed gas that had passed through the sample 41 was measured by the hydrogen sulfide measuring instrument 60. The amount of $H_2S$ was recorded at intervals of 1 sec, and these were integrated and were measured as a cumulative generation amount (mL/g) per 1 g of the solid electrolyte. Further, for reference, the dew point of the mixed gas after exposure was measured by the dew point meter 50. The cumulative generation amount of $H_2S$ generated between 0 to 60 min was set as the initial stage generation amount, and the cumulative generation amount of $H_2S$ generated between 0 to the end of measurement was set as the entire period generation amount. The standard measurement time was 360 min, and the measurement time was extended as necessary.

In order to remove $H_2S$ from the air after measurement, it was passed through an alkali trap 70.

(1-2) Breakthrough Time

Figure 6:
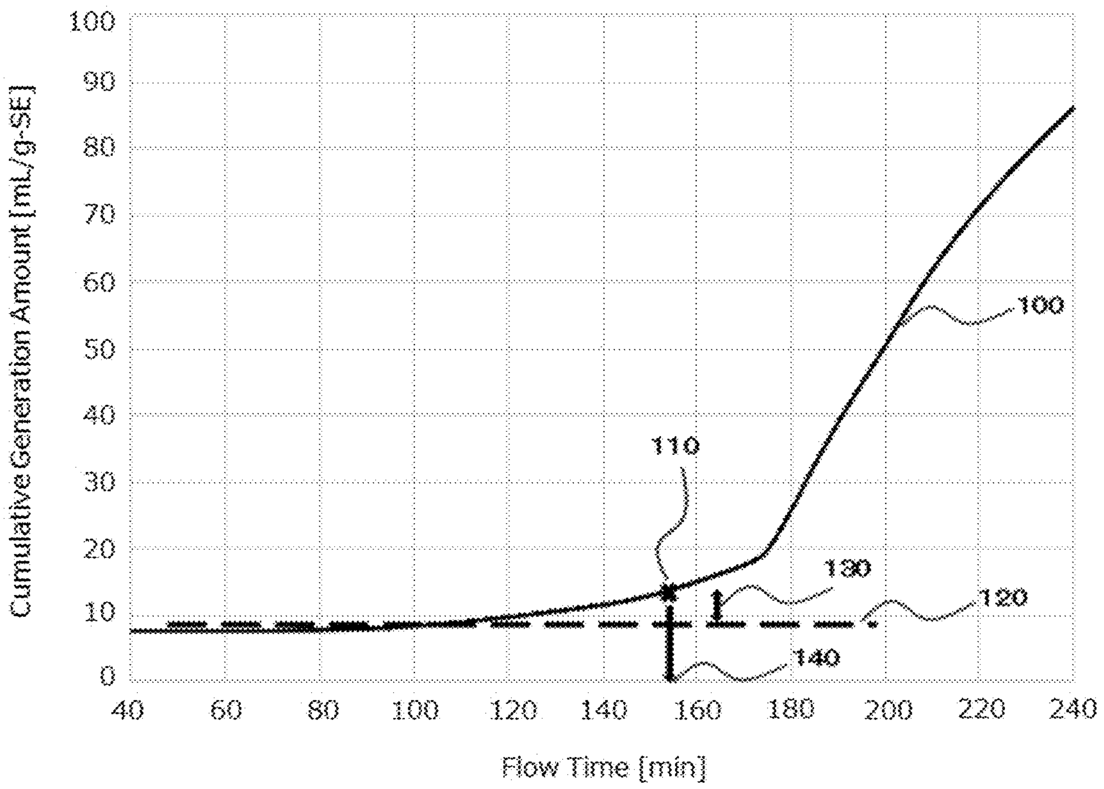
FIG. 6 is a schematic view illustrating a preferable method of determining a breakthrough time.

The breakthrough time was determined from a result 100 obtained in (1-1) measurement of $H_2S$ gas generation amount (see FIG. 6). A flow time 140 at a point 110 (corresponding to 130) at which the generated $H_2S$ gas was 5 mL/g larger than the average value 120 of cumulative generation amounts for 60 min and 120 min as the flow time was set as the breakthrough time (min).

When the breakthrough was not confirmed by the end of measurement, for example, when the breakthrough time was greater than 360 min, 360< was written.

(1-3) Volume-Based Average Particle Diameter ($D_{50}$)

Measurement was performed by a laser diffraction/scattering particle diameter distribution measuring device ("Partica LA-950 (model number)", manufactured by HORIBA Ltd.).

Dehydrated 2-ethyl-1-hexane (manufactured by Wako Pure Chemical, special grade) was used as a dispersion medium. 50 mL of a dispersion medium was injected into a flow cell of the device and was circulated, and then, the measurement target was added and subjected to ultrasonic treatment. Then, a particle diameter distribution was measured. The addition amount of the measurement target was adjusted on a measurement screen specified by the device such that the red light transmittance (R) corresponding to particle concentration falls within 80 to 90%, and the blue light transmittance (B) falls within 70 to 90%. Further, as the calculation conditions, 1.81 and 1.43 were used as the refractive index value of the measurement target, and the refractive index value of the dispersion medium, respectively. In setting the distribution form, the number of repetitions was fixed at 15, and then the particle size was calculated.

(1-4) Measurement of Ionic Conductivity

In this Example, the ionic conductivity was measured as follows.

From the sulfide solid electrolyte, a circular pellet with a diameter of 10 mm (cross-sectional area S: 0.785 cm 2), and a height (L) of 0.1 to 0.3 cm was formed and was used as a sample. Electrode terminals were taken from the top and bottom of the sample, and were subjected to measurement at 25° C. through an AC impedance method (frequency range: 1 MHz to 100 Hz, amplitude: 10 mV) so that a Cole-Cole plot was obtained. Near the right end of an arc observed in the high frequency-side region, the ionic conductivity σ (S/cm) was calculated according to the following formula, by using a real part Z' (Ω) at a point where −Z" ($S_2$) was minimized, as the bulk resistance R (Ω) of the electrolyte.

$$R=p(L/S)$$

$$\sigma=1/\rho$$

(1-5) X-Ray Diffraction (XRD) Measurement (XRD Pattern)

By XRD measurement, the obtained crystalline product was measured.

A groove having a diameter of 20 mm, and a depth of 0.2 mm was filled with the powder of the precursor or the solid electrolyte produced in each Example, followed by flattening with glass. Then, this was taken as a sample. This sample was sealed with a Kapton film for XRD and then was measured without contact with air.

This was performed by using a powder X-ray diffraction measurement device of BRUKER corporation, D2 PHASER, under following conditions.

Tube voltage: 30 kV
Tube current: 10 mA
X-ray wavelength: Cu-Karay (1.5418 Å)
Optical system: concentration method
Slit configuration: solar slit 4° (both incident side light receiving side), divergence slit 1 mm, Kβ filter (Ni plate 0.5%), use of air scatter screen 3 mm)
detector: semiconductor detector
measurement range: 2θ=10-60 deg
step width, scan speed: 0.05 deg, 0.05 deg/sec (1-6) pH Measurement The pH measurement was performed as follows in this Example.

The powder of the solid electrolyte produced in each Example was dissolved in ion exchanged water to a concentration of 1% by mass, and was agitated for 1 min until the aqueous solution became uniform and transparent.

The pH of the obtained aqueous solution was measured by using a pH meter (model number: AS600) manufactured by AS ONE Corporation.

(2) Production of Sulfide Solid Electrolyte (2-1) Preparation of Crystalline Sulfide Solid Electrolyte (1) (Liquid Phase Method)

Into a 1 L agitation blade-equipped reaction vessel, 13.19 g of lithium sulfide, 21.26 g of diphosphorus pentasulfide, 4.15 g of lithium bromide and 6.40 g of lithium iodide were introduced under a nitrogen atmosphere. To this, 100 mL of tetramethylethylenediamine (TMEDA) as a complexing agent, and 800 mL of cyclohexane as a solvent were added, and the agitation blade was operated to perform mixing by agitation. 456 g of zirconia balls (diameter: 0.5 mmφ) were placed in a bead mill ("STARMILL LMZ015 (model number)", manufactured by Ashizawa Finetech Ltd.) that can be operated through circulation (filling rate of beads in the crushing chamber: 80%), and pulverization was performed for 60 min through circulation between the reaction vessel and the crushing chamber, under the conditions of a pump flow rate of 550 mL/min, a peripheral speed of 8 m/s, and a mill jacket temperature of 20° C. Then, a slurry of the electrolyte precursor was obtained.

Next, the obtained electrolyte precursor slurry was immediately dried at room temperature (23° C.) under a reduced pressure (degree of vacuum: 300 Pa or less) so as to obtain a powdery electrolyte precursor.

In a glove box, a can body (capacity: 150 ml) of a vibration dryer was filled with 30 g of the obtained powdery electrolyte precursor. The degree of vacuum was set to 100 Pa or less, and the temperature was increased stepwise until the powder temperature reached 110° C. The heating was performed by circulating a heat medium heated to a predetermined temperature in a heat medium unit, through the jacket of the vibration dryer. During the heat treatment, the heat medium circulation rate was adjusted such that the degree of vacuum did not exceed 100 Pa. The end of the complex decomposition was determined on the basis of the fact that 1 h or more had passed since the powder temperature exceeded 110° C., and the degree of vacuum had returned to the value before the start of heating. The obtained powdery amorphous solid electrolyte was heated at a heating temperature of 200° C. for 2 h under a reduced pressure (degree of vacuum: 300 Pa or less) to obtain a powdery crystalline sulfide solid electrolyte (1). The XRD pattern of the crystalline sulfide solid electrolyte (1) is the same as in FIG. 4, and it was confirmed that a thio-LISICON Region II type crystal structure is contained. The ionic conductivity was 3.5 mS/cm (listed as Comparative Example 1 in Table 1).

(2-2) Preparation of Crystalline Sulfide Solid Electrolyte (2) (Solid Phase Method)

"Bead mill LMZ015" (manufactured by Ashizawa Fine Tech Ltd.) was used as a bead mill, and 485 g of zirconia balls with a diameter of 0.5 mm was prepared. Further, as a reaction vessel, a 2.0-liter glass reactor equipped with an agitator was used.

13.19 g of lithium sulfide, 21.26 g of diphosphorus pentasulfide, 4.15 g of lithium bromide, and 6.40 g of lithium iodide (in $[(1\text{-}X\text{-}Y)(0.75Li_2S/0.25P_2S_5)/XLiBr/YLiI]$, X=0.1, Y=0.1) were charged into the reaction vessel, and 1000 mL of dehydrated toluene was further added to form a slurry.

The slurry charged into the reaction vessel was circulated at a flow rate of 600 mL/min by using a pump within the bead mill device. The peripheral speed of the bead mill was set as 12 m/s, and hot water (HW) flowed through external circulation, and then the reaction was carried out such that the discharge temperature of the pump was maintained at 70° C. The obtained slurry, from which the supernatant liquid was removed, was placed on a hot plate, and was dried at 80° C. to obtain a powdery amorphous sulfide solid electrolyte. The obtained powdery amorphous sulfide solid electrolyte was heated at 195° C. for 3 h by using a hot plate provided in a glove box to obtain a powdery crystalline sulfide solid electrolyte (2). The XRD pattern of the crystalline sulfide solid electrolyte (2) is the same as in FIG. 7, and it was confirmed that a thio-LISICON Region II type crystal structure is contained. The ionic conductivity was 5.2 mS/cm (listed as Comparative Example 2 in Table 1).

(2-3) Particle Size Control of Crystalline Sulfide Solid Electrolyte (1)

"Bead mill LMZ015" (manufactured by Ashizawa Fine Tech Ltd.) was used as a bead mill, and 456 g of zirconia balls with a diameter of 0.5 mm was prepared. Further, as a reaction vessel, a 2.0-liter glass reactor equipped with an agitator was used.

100 g of the crystalline sulfide solid electrolyte (1) prepared in (2-1) was charged into the reaction vessel, and 790 mL of dehydrated toluene, and 65 mL of dibutylether were further sequentially added to form a slurry.

Figure 7:
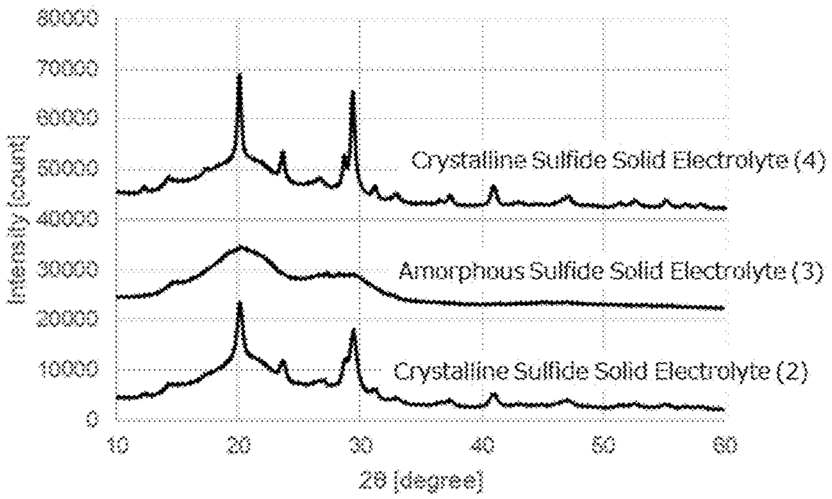
FIG. 7 is XRD patterns of a crystalline sulfide solid electrolyte (2), an amorphous sulfide solid electrolyte (3) and a crystalline sulfide solid electrolyte (4) prepared in Examples.

Pulverization was performed for 60 min through circulation between the reaction vessel and a crushing chamber under conditions of a pump flow rate of 550 mL/min, a peripheral speed of 12 m/s, and a mill jacket temperature of 40° C., and then, pulverization was performed for 120 min through circulation under conditions of a pump flow rate of 550 mL/min, a peripheral speed of 12 m/s, and a mill jacket temperature of 20° C. to obtain a slurry of the solid electrolyte. The obtained slurry was immediately dried at room temperature (23° C.) under a reduced pressure (degree of vacuum: 300 Pa or less) to obtain a powdery amorphous sulfide solid electrolyte (3). The XRD pattern of the amorphous sulfide solid electrolyte (3) is illustrated in FIG. 7.

(2-4) Crystallization of Amorphous Sulfide Solid Electrolyte (3)

The amorphous sulfide solid electrolyte (3) prepared in (2-3) was placed in a 1 L glass Schlenk vessel within a glove box, and was heated at 190° C. under a reduced pressure (degree of vacuum: 100 Pa or less) by using an oil bath to obtain a powdery crystalline solid electrolyte (4). The XRD pattern is the same as in FIG. 7, and it was confirmed that a thio-LISICON Region II type crystal structure is contained. The volume-based average particle diameter was 1.2 μm, and the ionic conductivity was 4.6 mS/cm (listed as Comparative Example 3 in Table 1).

Example 1 and Comparative Example 1

In a nitrogen glove box with a dew point of −80° C., 0.99 g of the crystalline sulfide solid electrolyte (1) prepared in (2-1) and 0.01 g of $Li_2S$ were mixed by using a mortar and a pestle so as to produce a crystalline modified sulfide solid electrolyte. Table 1 illustrates the ionic conductivity of the crystalline modified sulfide solid electrolyte.

Figure 8:
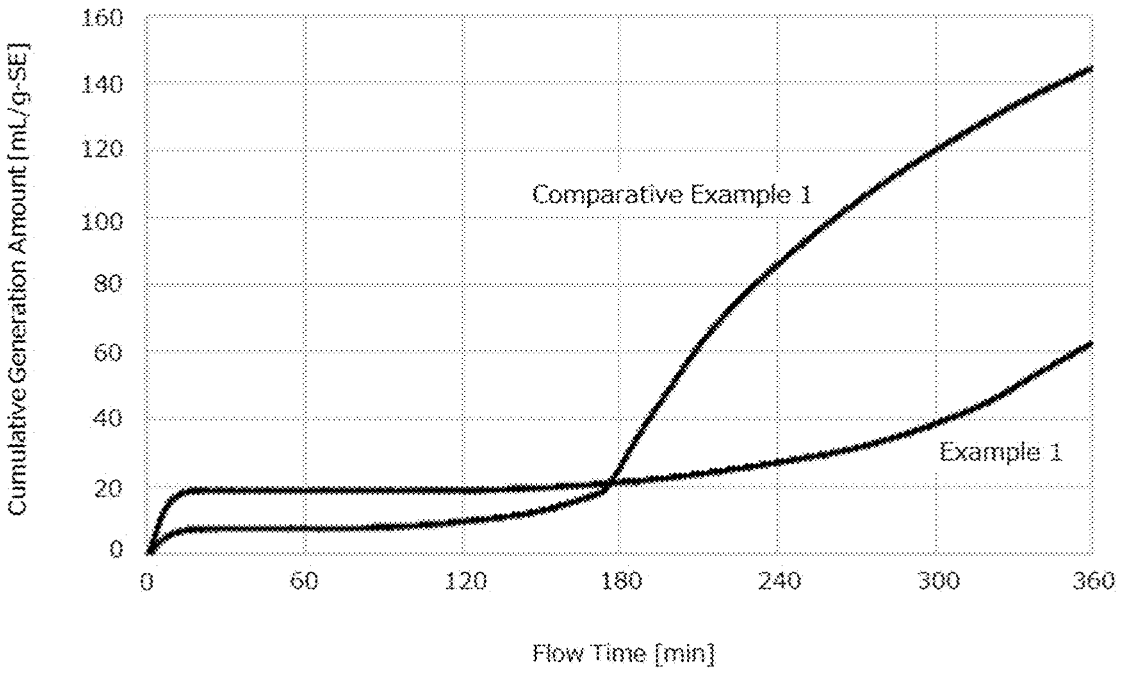
FIG. 8 is measurement results of $H_2S$ gas generation amounts in Example 1 and Comparative Example 1.

FIG. 8 illustrates the measured generation amount of $H_2S$ gas. Table 2 illustrates $H_2S$ gas generation amounts for the initial stage and the entire period, the breakthrough time and the pH value. For comparison, the crystalline sulfide solid electrolyte (1) was set as Comparative Example 1.

The crystalline modified sulfide solid electrolyte obtained in Example 1 and SUS powder (100 mg in total, sulfide solid electrolyte: SUS powder=50:50 (volume ratio)) were mixed by using a mortar for 10 min to obtain measurement powder (1) (an electrode combined material).

60 mg of a separator layer electrolyte was added to a battery cell with a diameter of 10 mm, and was pressed with a SUS mold three times at 10 MPa/cm 2 while rotated by 120° each time. Then, 3.5 mg of the measurement powder (1) was added, and was pressed three times at 20 MPa/cm 2 while rotated by 120° each time. Then, the opposite side of the measurement powder (1) was pressed at 20 MPa/cm 2 three times while rotated by 120° each time.

The separator layer electrolyte was synthesized under the following conditions.

20.5 g of $L_2S$, 33.1 g of $P_2S_5$, 10.0 g of LiI, and 6.5 g of LiBr were added to a 1 L reaction vessel equipped with an agitation blade under a nitrogen atmosphere. After the agitation blade was rotated, 630 g of toluene was introduced, and this slurry was agitated for 10 min. The reaction vessel was connected to a bead mill that can be operated through circulation ("STARMILL LMZ015 (product name)" manufactured by Ashizawa Fine Tech Ltd., zirconia bead material: zirconia, bead diameter: 0.5 mmφ, use amount of beads: 456 g), and a pulverization treatment was performed for 45 h (pump flow rate: 650 mL/min, bead mill peripheral speed: 12 m/s, mill jacket temperature: 45° C.).

The obtained slurry was dried at room temperature (25° C.) under vacuum, and was heated (80° C.) to obtain white amorphous solid electrolyte powder. Furthermore, the obtained white powder was heated under vacuum at 195° C. for 2 h so as to obtain white crystalline solid electrolyte powder. Crystallization peaks were detected at 2θ=20.2° and 23.6° in the XRD spectrum of the crystalline solid electrolyte, and it was confirmed that a thio-LISICON Region II type crystal structure was contained. Further, the average particle size ($D_{50}$) of the obtained crystalline solid electrolyte was 4.5 μm, and the ionic conductivity was 5.0 mS/cm.

An InLi foil (this constitutes a layered structure, and "I" means between layers. In: 10 mmφ×0.1 mm/Li: 9 mmφ×0.08 mm/SUS: 10 mmφ×0.1 mm) was provided on the separator layer electrolyte on the side opposite to the measurement powder (1), and was pressed at once at 6 MPa/cm 2. The cell was fixed with four screws with an insulator interposed therebetween such that short-circuit is not caused between the measurement powder (1) and the InLi foil. The screws were fixed with a torque of 8 N m and then a lithium ion battery was obtained.

TABLE 1

| | Raw Material Electrolyte | Amount of $Li_2S$ (part by mass) | Mixing Method | Crystallization Temperature (° C.) | Ionic Conductivity (mS/cm) |
|---|---|---|---|---|---|
| Example 1 | Crystalline Sulfide Solid Electrolyte, Amorphous Sulfide Solid Electrolyte (1) | 1.0 | Dry Mortar | | 4.0 |
| Example 2 | Crystalline Sulfide Solid Electrolyte, Amorphous Sulfide Solid Electrolyte (2) | 1.0 | Dry Mortar | | 5.1 |
| Example 3 | Crystalline Sulfide Solid Electrolyte, Amorphous Sulfide Solid Electrolyte (4) | 1.0 | Dry Mortar | | 4.6 |
| Example 4 | Crystalline Sulfide Solid Electrolyte, Amorphous Sulfide Solid Electrolyte (4) | 3.0 | Dry Mortar | | 4.2 |
| Example 5 | Crystalline Sulfide Solid Electrolyte, Amorphous Sulfide Solid Electrolyte (4) | 6.0 | Dry Mortar | | 4.2 |
| Example 6 | Crystalline Sulfide Solid Electrolyte, Amorphous Sulfide Solid Electrolyte (3) | 0.5 | Dry Mortar | 190 | 3.7 |
| Example 7 | Crystalline Sulfide Solid Electrolyte, Amorphous Sulfide Solid Electrolyte (3) | 1.0 | Dry Mortar | 190 | 4.1 |
| Example 8 | Crystalline Sulfide Solid Electrolyte, Amorphous Sulfide Solid Electrolyte (3) | 2.0 | Dry Mortar | 190 | 4.0 |
| Example 9 | Crystalline Sulfide Solid Electrolyte, Amorphous Sulfide Solid Electrolyte (3) | 3.0 | Dry Mortar | 190 | 4.0 |
| Example 10 | Crystalline Sulfide Solid Electrolyte, Amorphous Sulfide Solid Electrolyte (1) | 2.0 | Wet Bead Mill | 190 | 4.5 |
| Comparative Example 1 | Crystalline Sulfide Solid Electrolyte, Amorphous Sulfide Solid Electrolyte (1) | | | | 3.5 |
| Comparative Example 2 | Crystalline Sulfide Solid Electrolyte, Amorphous Sulfide Solid Electrolyte (2) | | | | 5.2 |
| Comparative Example 3 | Crystalline Sulfide Solid Electrolyte, Amorphous Sulfide Solid Electrolyte (4) | | | | 4.6 |

TABLE 2

| | Initial Stage Generation Amount (mL/g) | Entire Period Generation Amount (mL/g) | Break-through Time (min) | pH value of 1 wt % Aqueous Solution |
|---|---|---|---|---|
| Example 1 | 18.9 | 62.7 | 211 | 11.20 |
| Comparative Example 1 | 7.6 | 144.4 | 154 | 7.35 |

Example 2 and Comparative Example 2

A crystalline modified sulfide solid electrolyte was produced in the same manner as in Example 1 except that the sulfide solid electrolyte and the use amount of $Li_2S$ were changed as noted in Table 1. Table 1 illustrates the ionic conductivity of the crystalline modified sulfide solid electrolyte.

Figure 9:
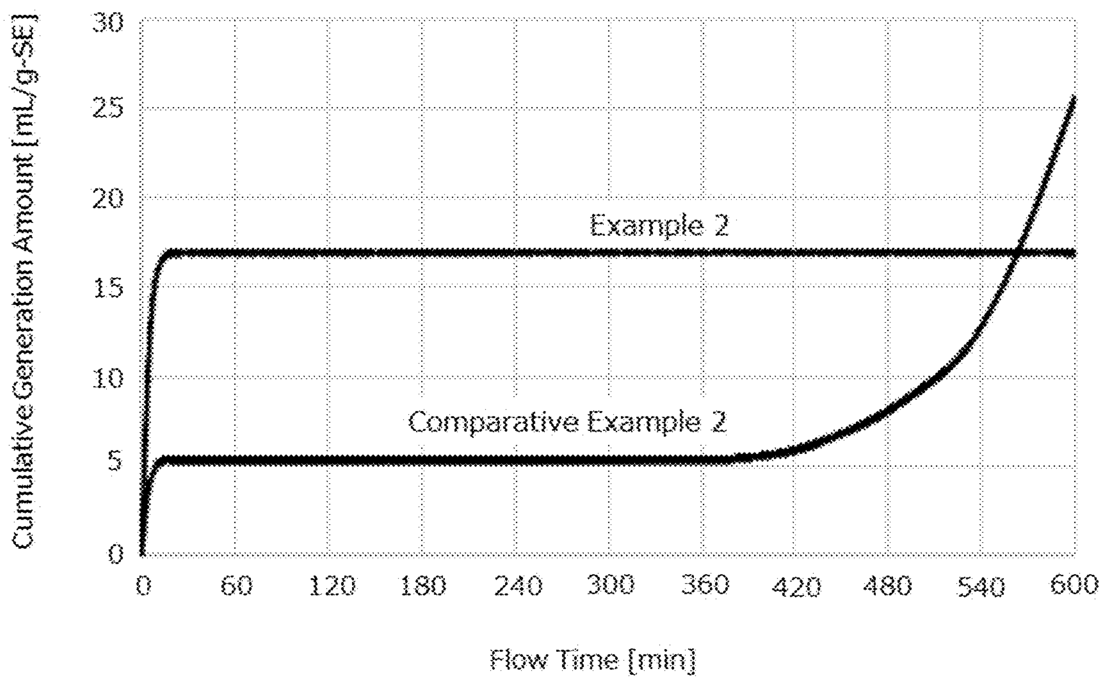
FIG. 9 is measurement results of $H_2S$ gas generation amounts in Example 2 and Comparative Example 2.

FIG. 9 illustrates the measured generation amount of $H_2S$ gas. Table 3 illustrates $H_2S$ gas generation amounts for the initial stage and the entire period, the breakthrough time and the pH value. For comparison, the crystalline sulfide solid electrolyte (2) was set as Comparative Example 2.

TABLE 3

| | Initial Stage Generation Amount (mL/g) | Entire Period Generation Amount (mL/g) | Break-through Time (min) | pH value of 1 wt % Aqueous Solution |
|---|---|---|---|---|
| Example 2 | 16.9 | 16.9 | 360< | 11.15 |
| Comparative Example 2 | 5.3 | 25.6 | 360< (517) | 7.17 |

Examples 3 to 5 and Comparative Example 3

A crystalline modified sulfide solid electrolyte was produced in the same manner as in Example 1 except that the sulfide solid electrolyte and the use amount of $Li_2S$ were changed as noted in Table 1. Table 1 illustrates the ionic conductivity of the crystalline modified sulfide solid electrolyte, and the XRD pattern is illustrated in FIG. 10.

Figure 11:
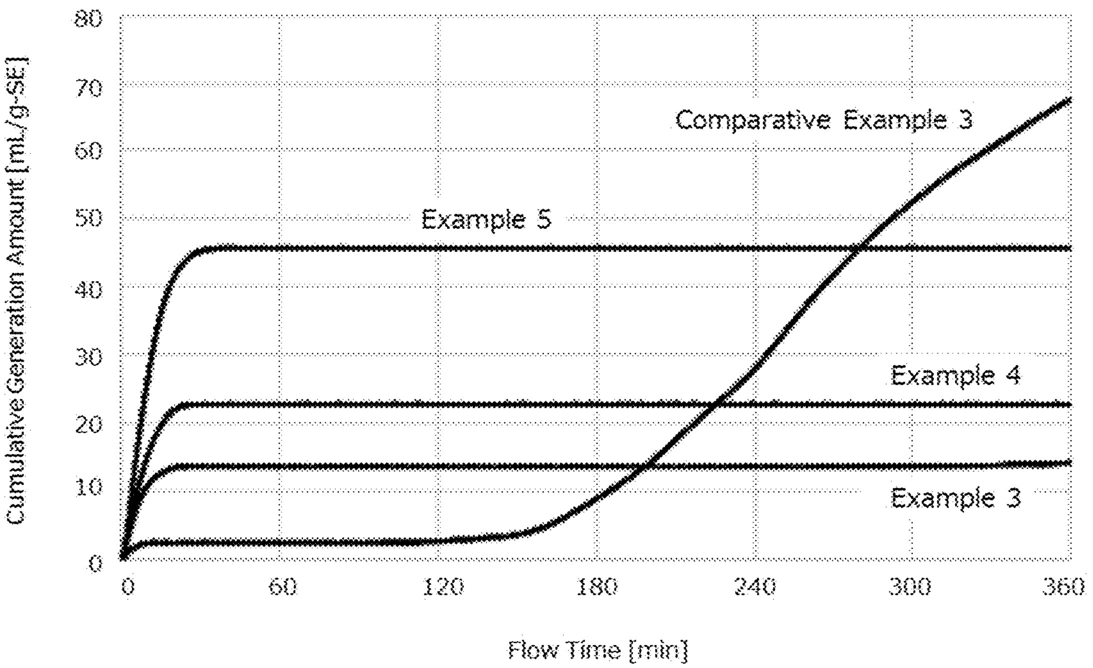
FIG. 11 is measurement results of $H_2S$ gas generation amounts in Examples 3 to 5 and Comparative Example 3.

FIG. 11 illustrates the measured generation amount of $H_2S$ gas. Table 4 illustrates $H_2S$ gas generation amounts for the initial stage and the entire period, the breakthrough time and the pH value. For comparison, the crystalline sulfide solid electrolyte (4) was set as Comparative Example 3.

TABLE 4

| | Initial Stage Generation Amount (mL/g) | Entire Period Generation Amount (mL/g) | Break-through Time (min) | pH value of 1 wt % Aqueous Solution |
|---|---|---|---|---|
| Example 3 | 13.6 | 13.2 | 360< | 11.21 |
| Example 4 | 22.8 | 22.8 | 360< | 11.65 |
| Example 5 | 45.7 | 45.7 | 360< | 11.89 |
| Comparative Example 3 | 2.4 | 67.6 | 174 | 7.09 |

Example 6

In a nitrogen glove box with a dew point of −80° C., 0.99 g of the amorphous sulfide solid electrolyte (3) prepared in (2-3) and 0.01 g of $Li_2S$ were mixed by using a mortar and a pestle so as to obtain an amorphous modified sulfide solid electrolyte.

The obtained amorphous modified sulfide solid electrolyte was placed in a 1 L glass Schlenk vessel within a glove box, and was heated at 190° C. under a reduced pressure (degree of vacuum: 100 Pa or less) by using an oil bath to produce a crystalline modified sulfide solid electrolyte. Table 1 illustrates the ionic conductivity of the crystalline modified sulfide solid electrolyte.

Figure 13:
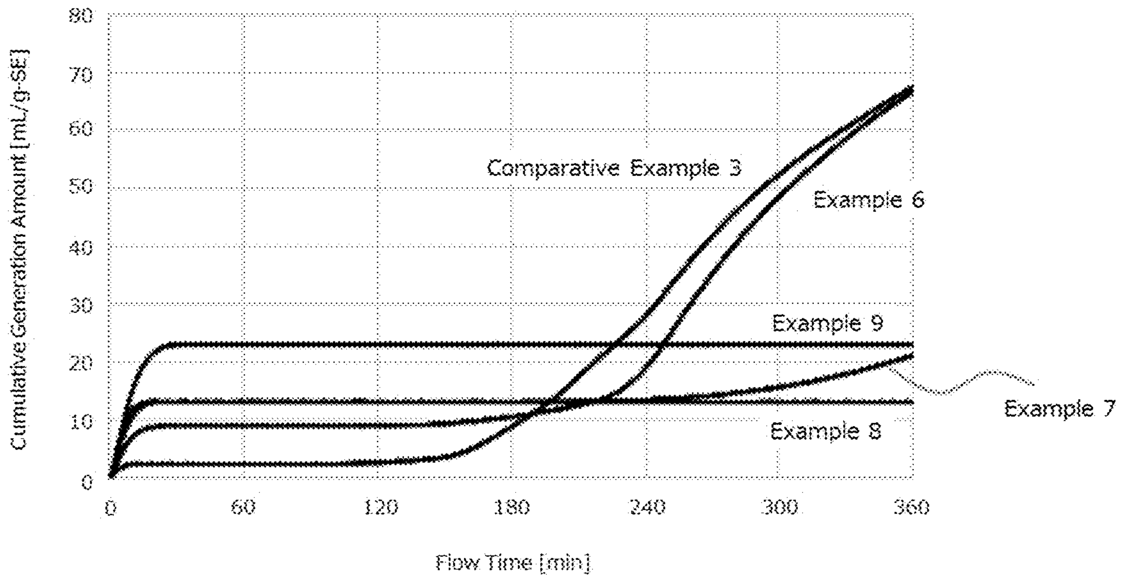
FIG. 13 is measurement results of $H_2S$ gas generation amounts in Examples 6 to 9 and Comparative Example 3.

FIG. 13 illustrates the measured generation amount of $H_2S$ gas. Table 5 illustrates $H_2S$ gas generation amounts for the initial stage and the entire period, the breakthrough time and the pH value. For comparison, the crystalline sulfide solid electrolyte (4) was set as Comparative Example 3.

TABLE 5

| | Initial Stage Generation Amount (mL/g) | Entire Period Generation Amount (mL/g) | Break-through Time (min) | pH value of 1 wt % Aqueous Solution |
|---|---|---|---|---|
| Example 6 | 9.1 | 66.7 | 233 | 10.58 |
| Example 7 | 13.2 | 21.2 | 332 | 11.20 |
| Example 8 | 13.1 | 13.1 | 360< | 11.69 |
| Example 9 | 23.0 | 23.0 | 360< | 11.69 |

Examples 7 to 9

Figure 12:
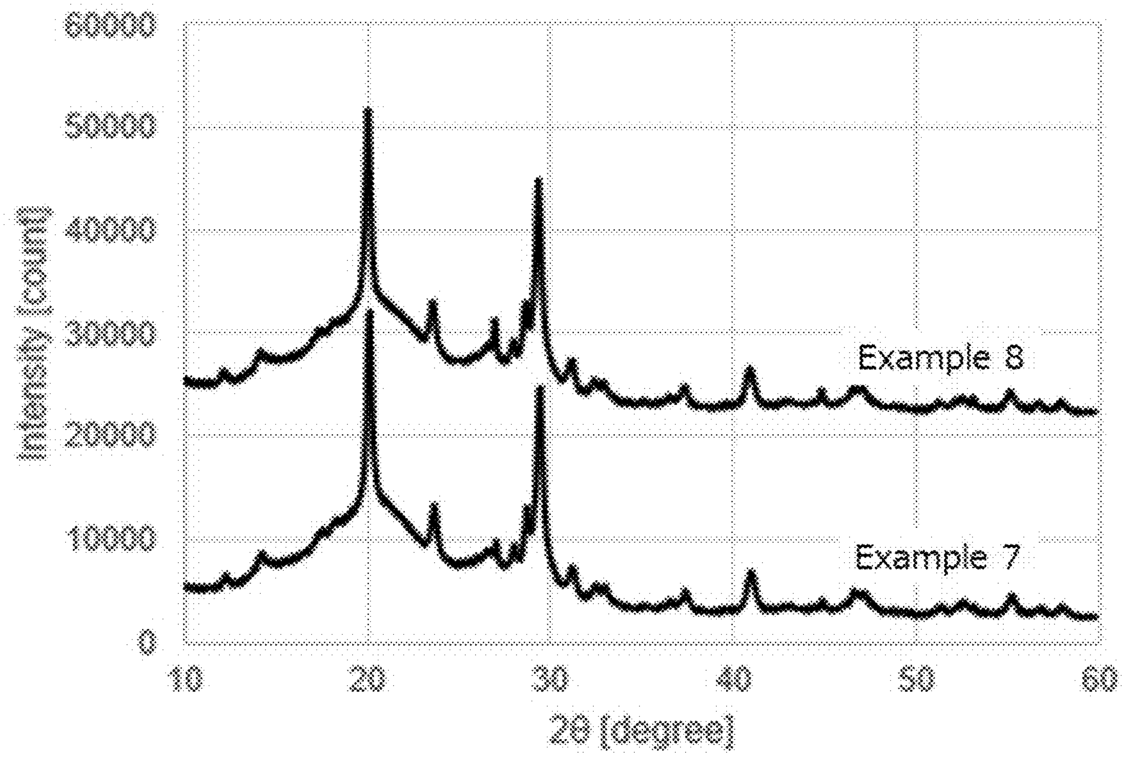
FIG. 12 is XRD patterns of crystalline modified sulfide solid electrolytes produced in Examples 7 and 8.

A crystalline modified sulfide solid electrolyte was produced in the same manner as in Example 6 except that the use amount of $Li_2S$ was changed as noted in Table 1. Table 1 illustrates the ionic conductivity of the crystalline modified sulfide solid electrolyte. FIG. 12 illustrates XRD patterns of the crystalline modified sulfide solid electrolytes produced in Examples 7 and 8.

FIG. 13 illustrates the measured generation amount of $H_2S$ gas. Table 5 illustrates $H_2S$ gas generation amounts for the initial stage and the entire period, the breakthrough time and the pH value. For comparison, the crystalline sulfide solid electrolyte (4) was set as Comparative Example 3.

Example 10

"Bead mill LMZ015" (manufactured by Ashizawa Fine Tech Ltd.) was used as a bead mill, and 456 g of zirconia balls with a diameter of 0.5 mm was prepared. Further, as a reaction vessel, a 2.0-liter glass reactor with an agitator was used.

98 g of the sulfide solid electrolyte prepared in (2-1) was charged into the reaction vessel, and 790 mL of dehydrated toluene and 65 mL of dibutylether were further sequentially added to form a slurry.

Pulverization was performed for 60 min through circulation between the reaction vessel and a crushing chamber under conditions of a pump flow rate of 550 mL/min, a peripheral speed of 12 m/s, and a mill jacket temperature of 40° C. Then, 2 g of $Li_2S$ was added to the slurry, and pulverization was performed for 120 min through circulation under conditions of a pump flow rate of 550 mL/min, a peripheral speed of 12 m/s, and a mill jacket temperature of 20° C. to obtain a slurry of the solid electrolyte. The obtained slurry was immediately dried at room temperature (23° C.) under a reduced pressure (degree of vacuum: 300 Pa or less) to obtain a powdery amorphous modified solid electrolyte.

Figure 14:
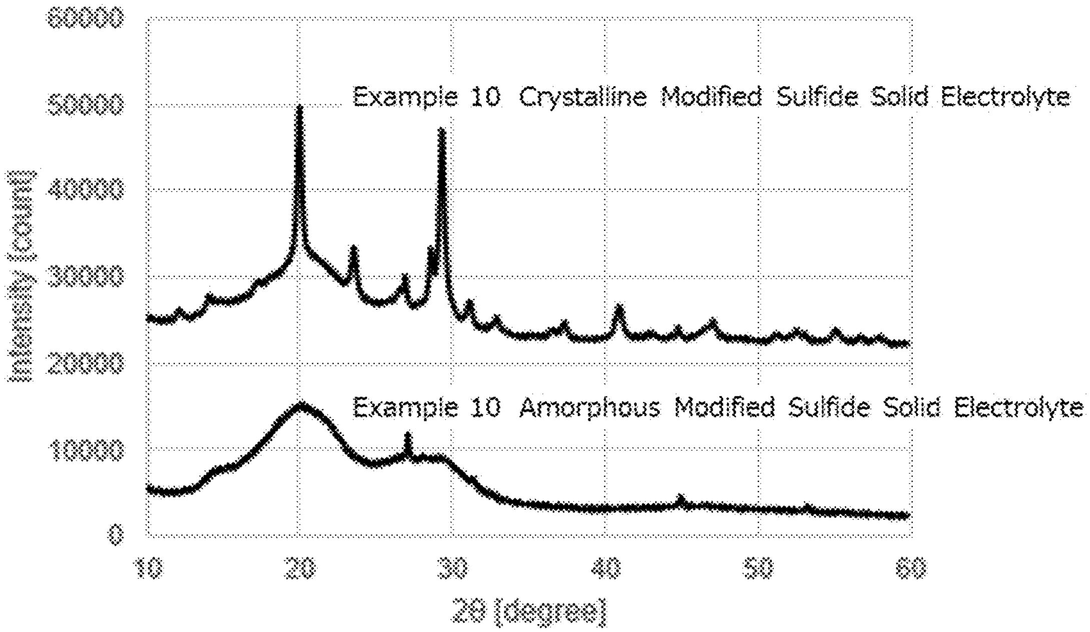
FIG. 14 is X-ray diffraction spectra of an amorphous modified sulfide solid electrolyte and a crystalline modified sulfide solid electrolyte produced in Example 10.
Figure 15:
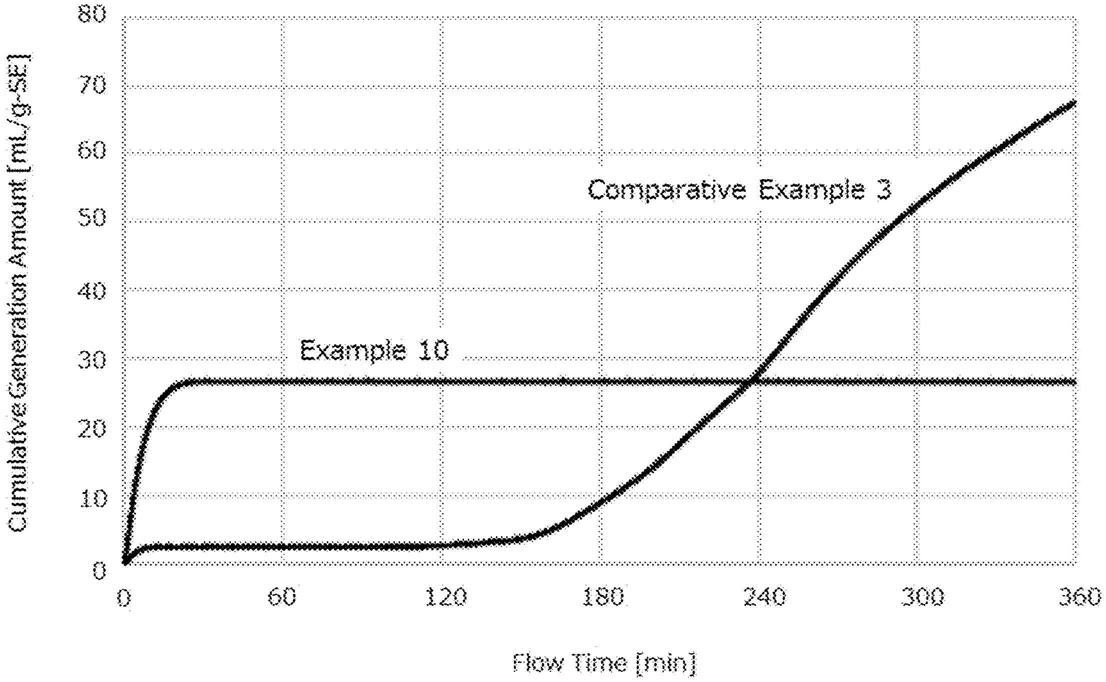
FIG. 15 is measurement results of $H_2S$ gas generation amounts in Example 10 and Comparative Example 3.

The obtained amorphous modified sulfide solid electrolyte was placed in a 1 L glass Schlenk vessel within a glove box, and was heated at 190° C. under a reduced pressure (degree of vacuum: 100 Pa or less) by using an oil bath to obtain a crystalline modified sulfide solid electrolyte. XRD patterns of the amorphous modified solid electrolyte and the crystalline modified solid electrolyte are illustrated in FIG. 14. As in Example 1, the measured generation amounts of $H_2S$ gas for the initial stage and the entire period, the breakthrough time and the pH value are illustrated in FIG. 15 and Table 6. For comparison, the crystalline sulfide solid electrolyte (4) was written as Comparative Example 3.

TABLE 6

| | Initial Stage Generation Amount (mL/g) | Entire Period Generation Amount (mL/g) | Break-through Time (min) | pH value of 1 wt % Aqueous Solution |
|---|---|---|---|---|
| Example 10 | 26.6 | 26.6 | 360< | 11.69 |
| Comparative Example 3 | 2.4 | 67.6 | 174 | 7.09 |

From each of comparisons between Example 1 and Comparative Example 1, and Example 3 and Comparative Example 3, for the crystalline sulfide solid electrolyte (1) prepared by the liquid phase method and the crystalline sulfide solid electrolyte (1) prepared using the same, it was confirmed that modification is effective in reducing the 112S generation amount while suppressing the ionic conductivity reduction regardless of the manufacturing method or the particle diameter. From the comparison between Example 2 and Comparative Example 2, even when the crystalline sulfide solid electrolyte (4) prepared by the solid phase method was used, it was confirmed that modification is effective in reducing the 112S generation amount, and that the modification effect is exhibited regardless of the producing method of the sulfide solid electrolyte. From Examples 3 to 5, it was confirmed that although the initial stage generation amount is increased in company with the addition of $Li_2S$, the generation amount during the entire period can be suppressed, and furthermore the ionic conductivity reduction can be kept to a minimum. From Examples 6 to 9, it was confirmed that a similar modification effect is also obtained for the amorphous solid electrolyte. From Example 10, it was confirmed that the same effect was also obtained when the modification method was a wet bead mill, that is, when the modification was performed by an atomization process. From the results of pH measurement, the unmodified solid electrolyte has an almost neutral pH (pH=6 to 8), and then becomes alkaline (pH=10 to 12) through modification with $Li_2S$. Thus, it is assumed that even if $H_2S$ is generated, the discharge of $H_2S$ as a gas to the outside of the system is suppressed, and the breakthrough time is prolonged, and furthermore, the effect of suppressing the entire period generation amount is also obtained.

INDUSTRIAL APPLICABILITY

According to the present embodiment, it is possible to produce a modified sulfide solid electrolyte in which ionic conductivity reduction is suppressed, and a cumulative generation amount of $H_2S$ gas is reduced over the medium- and long-term or the entire period even if the sulfide solid electrolyte comes in contact with moisture and $H_2S$ is generated. The modified sulfide solid electrolyte obtained by the production method of the present embodiment is suitably used for batteries, especially for lithium ion batteries used for information-related equipment or communication equipment such as PCs, video cameras, and mobile phones.

The invention claimed is:

1. A method of producing a modified sulfide solid electrolyte, the method comprising:

mixing a sulfide solid electrolyte with $Li_2S$;

wherein:

(100-α) parts by mass of the sulfide solid electrolyte is used per α parts by mass of $Li_2S$; and α represents a number of 0.3 to 8.0.

2. The method of producing a modified sulfide solid electrolyte according to claim 1, wherein the sulfide solid electrolyte contains a lithium atom, a sulfur atom, and a phosphorus atom.

3. The method of producing a modified sulfide solid electrolyte according to claim 2, wherein the sulfide solid electrolyte further contains a halogen atom.

4. The method of producing a modified sulfide solid electrolyte according to claim 1, wherein the sulfide solid electrolyte is a solid electrolyte represented by:

$$[(1\text{-}X\text{-}Y)(0.75Li_2S/0.25P_2S_5)/XLiBr/YLiI]$$

wherein X represents a number of 0 to 0.2, and Y represents a number of 0 to 0.2.

5. The method of producing a modified sulfide solid electrolyte according to claim 1, wherein the mixing is performed by using a pulverizer.

6. The method of producing a modified sulfide solid electrolyte according to claim 1, wherein the sulfide solid electrolyte is an amorphous sulfide solid electrolyte or a crystalline sulfide solid electrolyte.

7. The method of producing a modified sulfide solid electrolyte according to claim 1, further comprising:

obtaining the sulfide solid electrolyte by mixing a raw material component including at least one selected from a lithium atom, a sulfur atom, and a phosphorus atom, with a complexing agent.

8. The method of producing a modified sulfide solid electrolyte producing method according to claim 1, wherein the modified sulfide solid electrolyte includes a thio-LISICON Region II type crystal structure.

9. A method of producing a crystalline modified sulfide solid electrolyte, the method comprising:

further crystallizing a modified sulfide solid electrolyte obtained by the method according to claim 1.

10. A modified sulfide solid electrolyte comprising $Li_2S$ and a sulfide solid electrolyte represented by:

$$[(1\text{-}X\text{-}Y)(0.75Li_2S/0.25P_2S_5)/XLiBr/YLiI]$$

wherein X represents a number of 0 to 0.2, and Y represents a number of 0 to 0.2;

wherein:

$Li_2S$ is present in an amount of a parts by mass with respect to (100-$\alpha$) parts by mass of the sulfide solid electrolyte; and $\alpha$ represents a number of 0.3 to 8.0.

11. The modified sulfide solid electrolyte according to claim 10, wherein a 1% by mass aqueous solution of the modified sulfide solid electrolyte has a pH value of 9.0 or more.

12. An electrode combined material comprising the modified sulfide solid electrolyte according to claim 10, and an electrode active material.

13. A lithium ion battery comprising the modified sulfide solid electrolyte according to claim 10.

* * * * *